(12) United States Patent
Kamikawa et al.

(10) Patent No.: US 12,060,124 B2
(45) Date of Patent: Aug. 13, 2024

(54) ROBOT DEVICE

(71) Applicant: SONY GROUP CORPORATION, Tokyo (JP)

(72) Inventors: Yasuhisa Kamikawa, Tokyo (JP); Yasunori Kawanami, Tokyo (JP); Eisuke Ohshima, Tokyo (JP); Toshimitsu Kai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 108 days.

(21) Appl. No.: 17/769,862

(22) PCT Filed: Jul. 21, 2020

(86) PCT No.: PCT/JP2020/028261
§ 371 (c)(1),
(2) Date: Apr. 18, 2022

(87) PCT Pub. No.: WO2021/079578
PCT Pub. Date: Apr. 29, 2021

(65) Prior Publication Data
US 2022/0388585 A1     Dec. 8, 2022

(30) Foreign Application Priority Data

Oct. 25, 2019   (JP) .................................. 2019-194765

(51) Int. Cl.
*B62D 57/032*     (2006.01)
*B25J 9/00*       (2006.01)
*B25J 19/02*      (2006.01)

(52) U.S. Cl.
CPC .......... *B62D 57/032* (2013.01); *B25J 9/0009* (2013.01); *B25J 19/023* (2013.01)

(58) Field of Classification Search
CPC ..... B62D 57/032; B25J 9/0009; B25J 19/023; B25J 11/008; B25J 19/02; B25J 5/00
(Continued)

(56) References Cited

U.S. PATENT DOCUMENTS 7,228,203 B2 *  6/2007  Koselka ............... G05D 1/0251
                                              700/246
7,761,184 B2 *  7/2010  Moridaira ............. G06N 3/008
                                              700/250
(Continued)

FOREIGN PATENT DOCUMENTS

CN       205652232 U     10/2016
CN       109094681 A     12/2018
(Continued)

OTHER PUBLICATIONS

International Search Report and Written Opinion of PCT Application No. PCT/JP2020/028261, issued on Sep. 1, 2020, 10 pages of ISRWO.

*Primary Examiner* — David Luo
(74) *Attorney, Agent, or Firm* — CHIP LAW GROUP

(57) ABSTRACT

Provided is a robot device including a plurality of legs to perform a moving work. The robot device includes: a plurality of legs; and a body portion to which the legs are attached, the body portion having a bottom surface higher than a ground plane of the legs that are shortened to a maximum. The body portion includes a loading portion on which a load is placed in a space surrounded by the plurality of legs. Furthermore, an outer casing that covers the entire robot device including the plurality of legs is further provided. The outer casing includes an openable/closable lid or door on at least one of an upper surface, a front surface, a rear surface, a left side surface, or a right side surface.

19 Claims, 27 Drawing Sheets

(58) Field of Classification Search
USPC ............ 318/568.12, 568.11, 568.1, 567, 560
See application file for complete search history.

(56) References Cited

U.S. PATENT DOCUMENTS

| | | | | |
|---|---|---|---|---|
| 7,984,775 B2* | 7/2011 | Suga | ................... | B62D 57/032 |
| | | | | 180/8.1 |
| 8,108,070 B2* | 1/2012 | Tajima | ................. | B62D 57/032 |
| | | | | 700/245 |
| 9,271,888 B2* | 3/2016 | Park | ..................... | A61G 7/1046 |

FOREIGN PATENT DOCUMENTS

| | | |
|---|---|---|
| CN | 209410196 U | 9/2019 |
| JP | 60-099579 A | 6/1985 |
| JP | 2005-103725 A | 4/2005 |
| JP | 2016-074060 A | 5/2016 |
| JP | 2017-109294 A | 6/2017 |
| WO | 2020/004204 A1 | 1/2020 |

\* cited by examiner

ROBOT DEVICE

CROSS REFERENCE TO RELATED APPLICATIONS

This application is a U.S. National Phase of International Patent Application No. PCT/JP2020/028261 filed on Jul. 21, 2020, which claims priority benefit of Japanese Patent Application No. JP 2019-194765 filed in the Japan Patent Office on Oct. 25, 2019. Each of the above-referenced applications is hereby incorporated herein by reference in its entirety.

TECHNICAL FIELD

The technology disclosed in the present specification (hereinafter referred to as "the present disclosure") relates to a robot device including a plurality of legs to perform a moving work.

BACKGROUND ART

For example, in the field of physical distribution, the introduction of legged mobile robots applied to transportation of loads is being promoted. A work space of this type of legged mobile robot is not limited to level grounds such as factories and warehouses, but includes outdoor areas, rough grounds, and slopes, and overlaps with human living spaces, and it is expected that an interaction with a human, such as delivery of a load, will occur.

In a case where a legged mobile robot on which a load is placed goes up a slope, the legged mobile robot is required to be compact so as not to give a feeling of oppression to humans and to suppress fluctuations in the position of the center of gravity when the load is placed. Furthermore, in order to use the legged mobile robot in a crowd, the legged mobile robot is required to have such a level of safety that does not cause any problem even when interacting with a human. From the viewpoint of safety or posture stability, a legged mobile robot including four or more legs for transporting a load is promising. However, in a state in which a load is placed on an upper part of the body of this type of legged mobile robot (see, for example, Patent Document 1), the position of the center of gravity is high, and thus, it is difficult to maintain posture stability particularly when the legged mobile robot goes up a slope or walks on a rough ground. Furthermore, in the state in which a load is placed on the upper part of the body, the total length is high, which may give a feeling of oppression to surrounding humans.

Furthermore, a robot has been proposed that performs a walking work with legs with a body portion seated on the floor (see, for example, Patent Document 2). According to this type of robot, lowering the center of gravity makes it possible to secure safety, but it is difficult to make the robot compact because the legs spread outside the body in the seated posture.

Furthermore, assuming that a robot for transporting a load has an interaction with a human, it is preferable to perform force control of a movable part such as a leg. However, it is difficult to secure complete safety when control software is out of control. Moreover, the leg of the robot has a complicated shape, and it is difficult to attach a safety sensor for comprehensively monitoring the surroundings of the robot. Considering entanglement of foreign matter, such as finger pinching, the shape of the exterior of the leg is complicated, which is a big design constraint.

CITATION LIST

Patent Document

Patent Document 1: Japanese Patent Application Laid-Open No. 2017-109294
Patent Document 2: Japanese Patent Application Laid-Open No. 2016-74060

SUMMARY OF THE INVENTION

Problems to be Solved by the Invention

An object of the technology according to the present disclosure is to provide a robot device including a plurality of legs to perform a moving work.

Solutions to Problems

The technology according to the present disclosure has been made in consideration of the above problems, and provides a robot device including:
a plurality of legs; and
a body portion to which the legs are attached, the body portion having a bottom surface higher than a ground plane of the legs that are shortened to a maximum, in which
the body portion includes a loading portion on which a load is placed in a space surrounded by the plurality of legs.

The robot device further includes an outer casing that covers the entire robot device including the plurality of legs. The outer casing includes an openable/closable lid or door on at least one of an upper surface, a front surface, a rear surface, a left side surface, or a right side surface.

A surface of the outer casing may be provided with a removable decoration. Furthermore, a sensor such as an ambient observation sensor may be attached to the outer casing. In addition, a display capable of displaying advertisement information or the like may be attached to a surface of the outer casing.

Effects of the Invention

According to the technology according to the present disclosure, it is possible to provide a robot device including a plurality of legs to perform a moving work, which safely transports a heavy object in a stable posture without entanglement of foreign matter or the like.

Note that the effects described in the present specification are merely examples, and the effects brought about by the technology according to the present disclosure are not limited thereto. In addition, the technology according to the present disclosure may exert additional effects in addition to the above effects.

Still other objects, characteristics, and advantages of the technology according to the present disclosure will be clarified by more detailed description based on an embodiment described below and accompanying drawings.

MODE FOR CARRYING OUT THE INVENTION

Hereinafter, an embodiment of the technology according to the present disclosure will be described in detail with reference to the drawings.

A. Device Configuration

Figure 1:
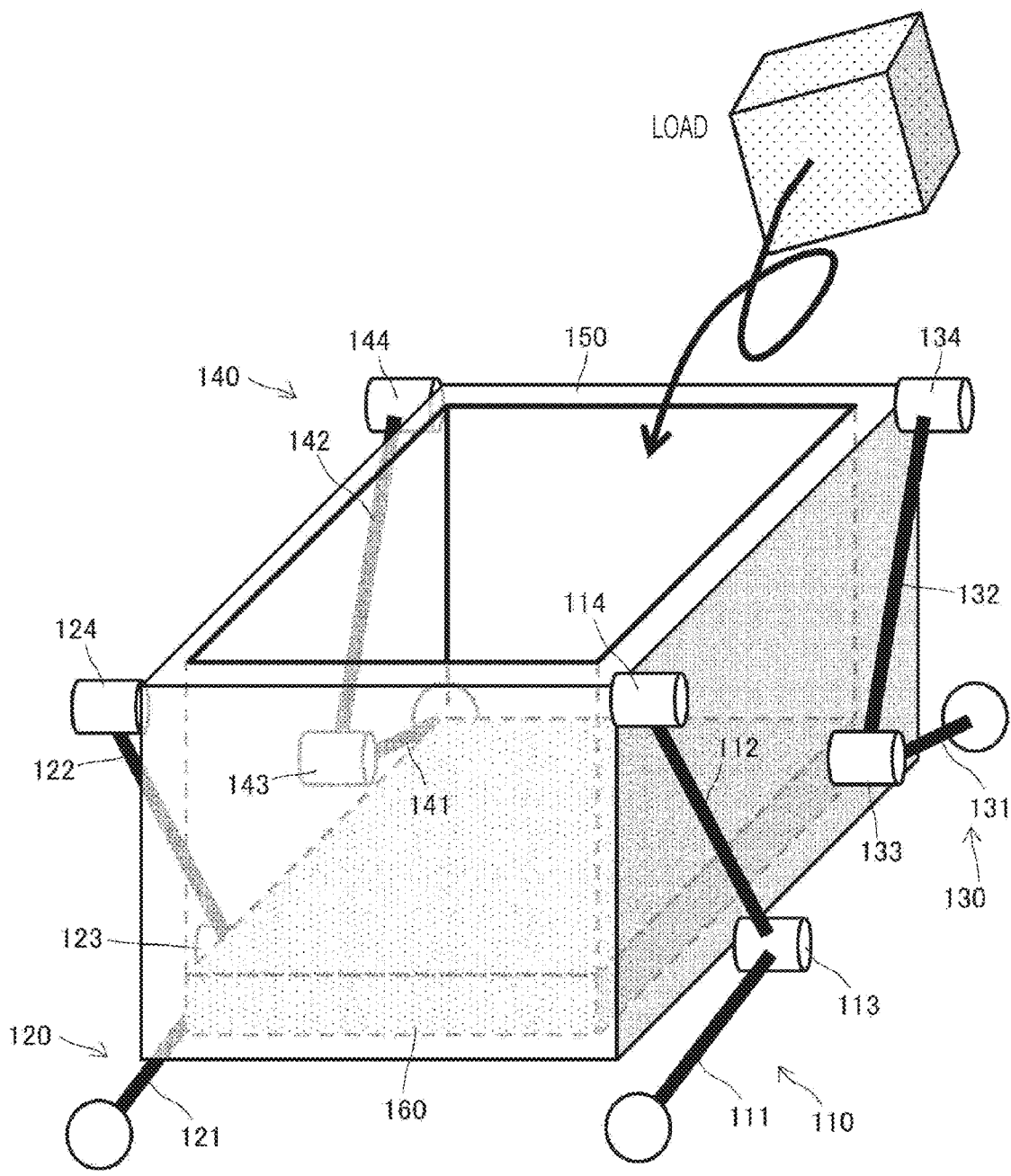
FIG. 1 is a diagram (perspective view) illustrating a configuration example of the degree of freedom of a robot device 100.
Figure 2:
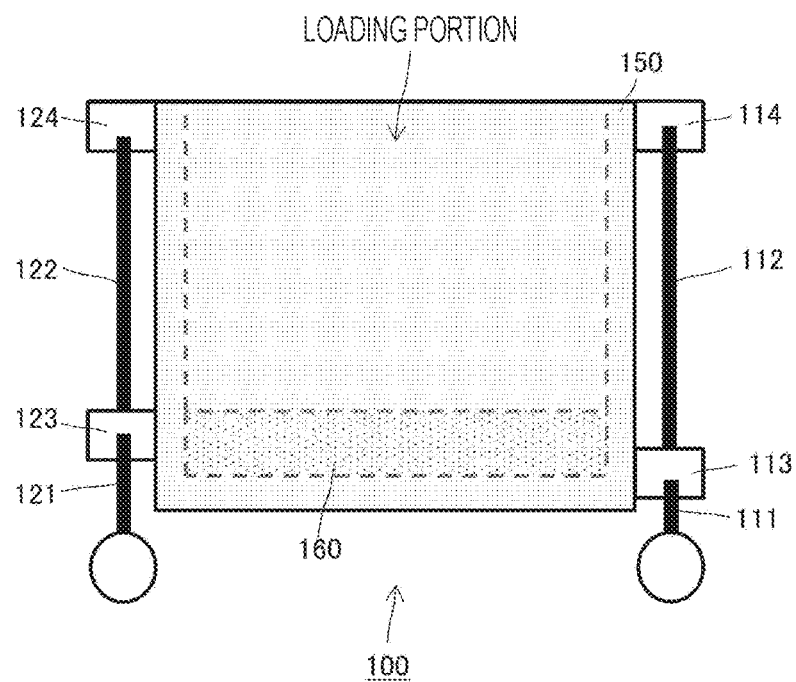
FIG. 2 is a diagram (front view) illustrating the configuration example of the degree of freedom of the robot device 100.
Figure 3:
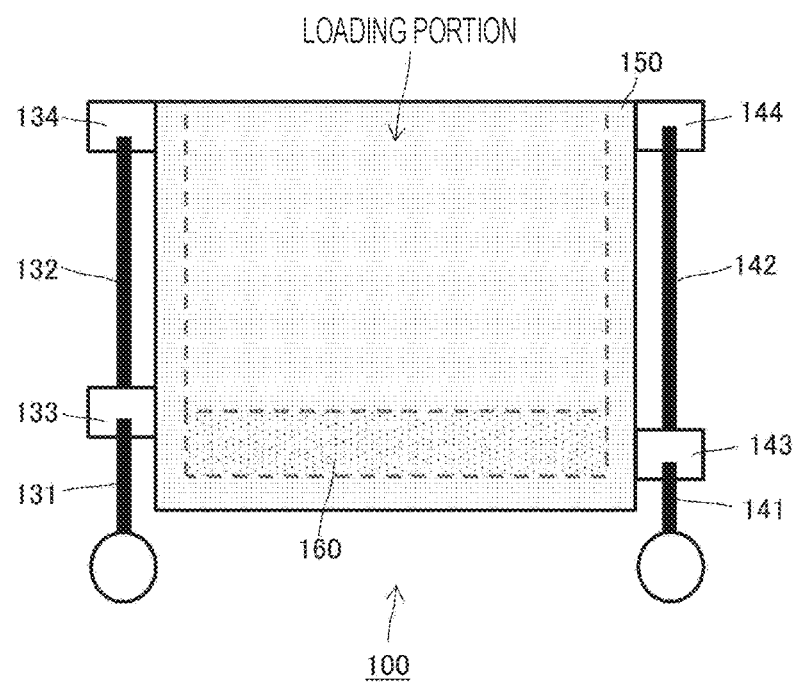
FIG. 3 is a diagram (rear view) illustrating the configuration example of the degree of freedom of the robot device 100.
Figure 4:
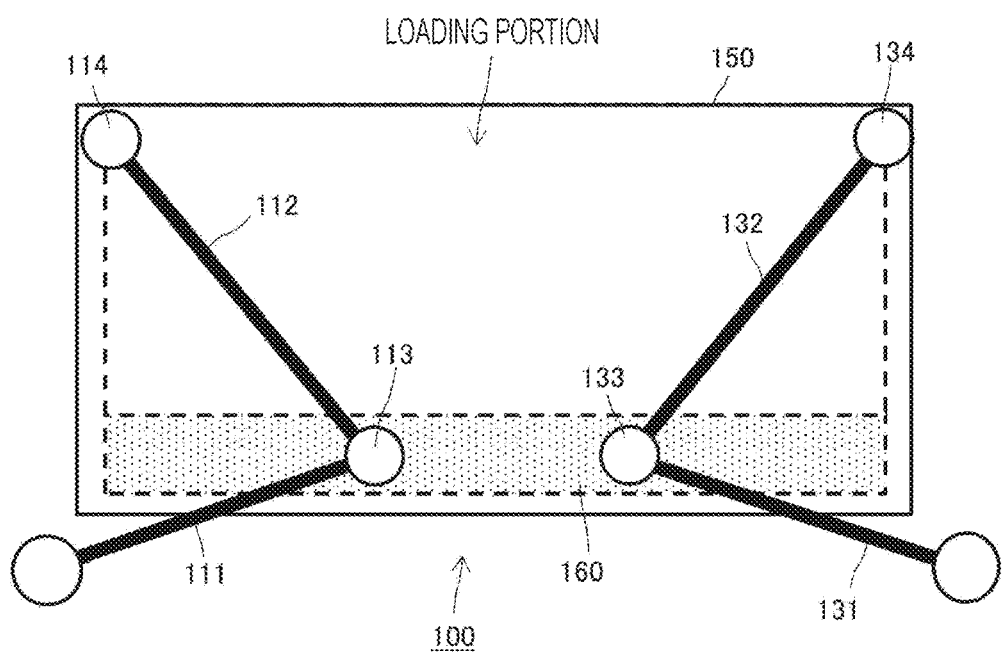
FIG. 4 is a diagram (left side view) illustrating the configuration example of the degree of freedom of the robot device 100.
Figure 5:
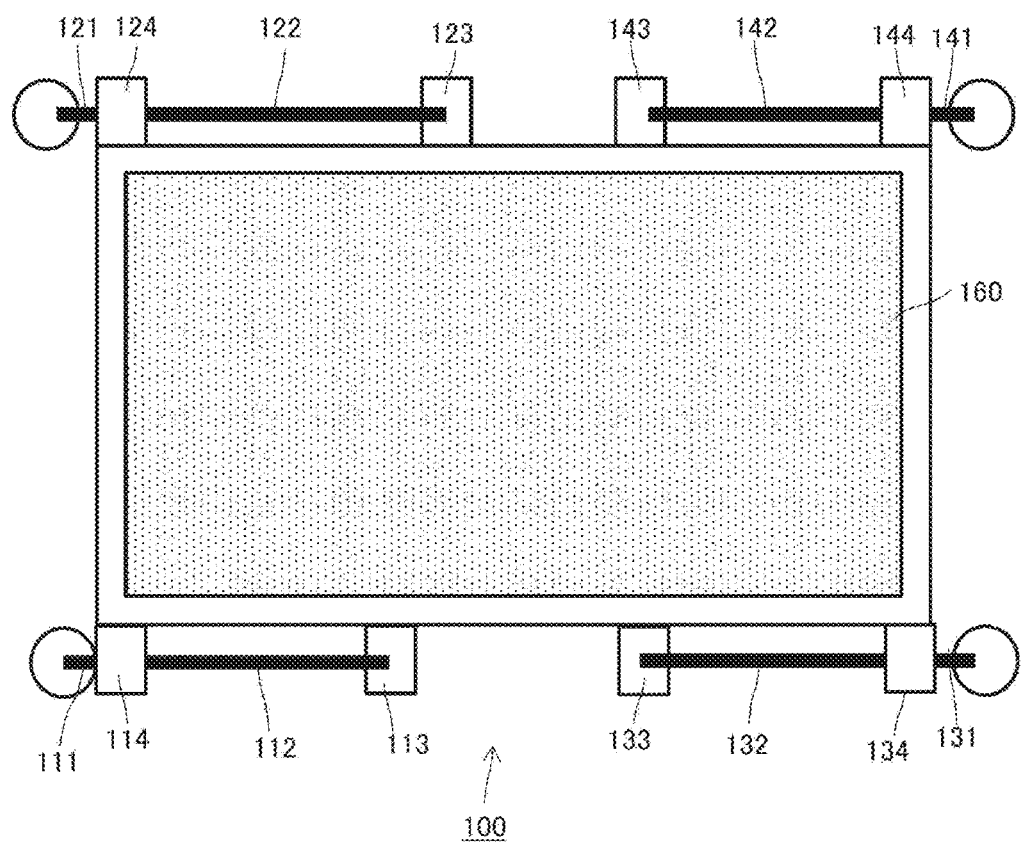
FIG. 5 is a diagram (top view) illustrating the configuration example of the degree of freedom of the robot device 100.

FIGS. 1 to 5 schematically illustrate a configuration example of the degree of freedom of a robot device 100 to which the technology according to the present disclosure is applied. In these drawings, FIG. 1 is a perspective view of the robot device 100 from the front left, FIG. 2 is a front view of the robot device 100, FIG. 3 is a rear view of the robot device 100, FIG. 4 is a left side view of the robot device 100, and FIG. 5 is a top view of the robot device 100.

The illustrated robot device 100 is configured as a quadruped walking robot including four movable legs. That is, the robot device 100 includes a body portion 150 of the walking robot and four movable legs 110, 120, 130, and 140 each connected to a corresponding one of the four corners of the body portion 150. The body portion 150 has a hollow box shape and serves as a loading portion for loading a load, and the load can be taken in and out through an opening on an upper surface or the like. It can be said that the structure is such that a load is placed in a space surrounded by the four movable legs 110, 120, 130, and 140. Furthermore, a controller 160 that houses an electric system such as a control circuit and a battery for driving is mounted on a bottom surface portion of the body portion 150. In addition, the leg 110 is a left front leg (LF), the leg 120 is a right front leg (RF), the leg 130 is a left rear leg (LR), and the leg 140 is a right rear leg (RR). The robot device 100 can walk by operating the legs 110, 120, 130, and 140 synchronously (while switching between standing legs and swing legs alternately). Furthermore, it is assumed that the robot device 100 transports the load placed on the body portion 150. The robot device 100 is applied to the field of physical distribution, and for example, transports the load from a final base to the time of delivery.

The leg 110 corresponding to the left front leg includes two links 111 and 112 and a knee joint portion 113 connecting the link 111 and the link 112. The other end (lower end)

of the link 111 corresponding to a lower leg portion corresponds to a toe and is in contact with the floor surface. Furthermore, the upper end of the link 112 corresponding to a thigh portion is attached to the body portion 150 via a hip joint portion 114. The knee joint portion 113 has a degree of freedom of rotation around the pitch axis, and can drive the link 111 around the pitch axis with respect to the link 112 by an actuator (not illustrated) such as a pitch axis rotation motor. Furthermore, the hip joint portion 114 has a degree of freedom of rotation around the pitch axis, and can drive the link 112 around the pitch axis with respect to the body portion 150 by an actuator (not illustrated) such as a pitch axis rotation motor.

Furthermore, the leg 120 corresponding to the right front leg includes two links 121 and 122 and a knee joint portion 123 connecting the link 121 and the link 122. The other end (lower end) of the link 121 corresponding to a lower leg portion corresponds to a toe and is in contact with the floor surface. Furthermore, the upper end of the link 122 corresponding to a thigh portion is attached to the body portion 150 via a hip joint portion 124. The knee joint portion 123 has a degree of freedom of rotation around the pitch axis, and can drive the link 121 around the pitch axis with respect to the link 122 by an actuator (not illustrated) such as a pitch axis rotation motor. Furthermore, the hip joint portion 124 has a degree of freedom of rotation around the pitch axis, and can drive the link 122 around the pitch axis with respect to the body portion 150 by an actuator (not illustrated) such as a pitch axis rotation motor.

Furthermore, the leg 130 corresponding to the left rear leg includes two links 131 and 132 and a knee joint portion 133 connecting the link 131 and the link 132. The other end (lower end) of the link 131 corresponding to a lower leg portion corresponds to a toe and is in contact with the floor surface. Furthermore, the upper end of the link 132 corresponding to a thigh portion is attached to the body portion 150 via a hip joint portion 134. The knee joint portion 133 has a degree of freedom of rotation around the pitch axis, and can drive the link 131 around the pitch axis with respect to the link 132 by an actuator (not illustrated) such as a pitch axis rotation motor. Furthermore, the hip joint portion 134 has a degree of freedom of rotation around the pitch axis, and can drive the link 132 around the pitch axis with respect to the body portion 150 by an actuator (not illustrated) such as a pitch axis rotation motor.

Furthermore, the leg 140 corresponding to the right rear leg includes two links 141 and 142 and a knee joint portion 143 connecting the link 141 and the link 142. The other end (lower end) of the link 141 corresponding to a lower leg portion corresponds to a toe and is in contact with the floor surface. Furthermore, the upper end of the link 142 corresponding to a thigh portion is attached to the body portion 150 via a hip joint portion 144. The knee joint portion 143 has a degree of freedom of rotation around the pitch axis, and can drive the link 141 around the pitch axis with respect to the link 142 by an actuator (not illustrated) such as a pitch axis rotation motor. Furthermore, the hip joint portion 144 has a degree of freedom of rotation around the pitch axis, and can drive the link 142 around the pitch axis with respect to the body portion 150 by an actuator (not illustrated) such as a pitch axis rotation motor.

The movable legs 110, 120, 130, and 140 each have two degrees of freedom, that is, the degree of freedom of rotation around the pitch axis of the knee joint and the degree of freedom of rotation around the pitch axis of the hip joint, and the entire robot device 100 has eight degrees of freedom. Although the robot device 100 illustrated in FIG. 1 includes four legs, it should be understood that the technology according to the present disclosure can be applied even if the robot device 100 is equipped with two legs, three legs, or five or more legs.

Figure 6:
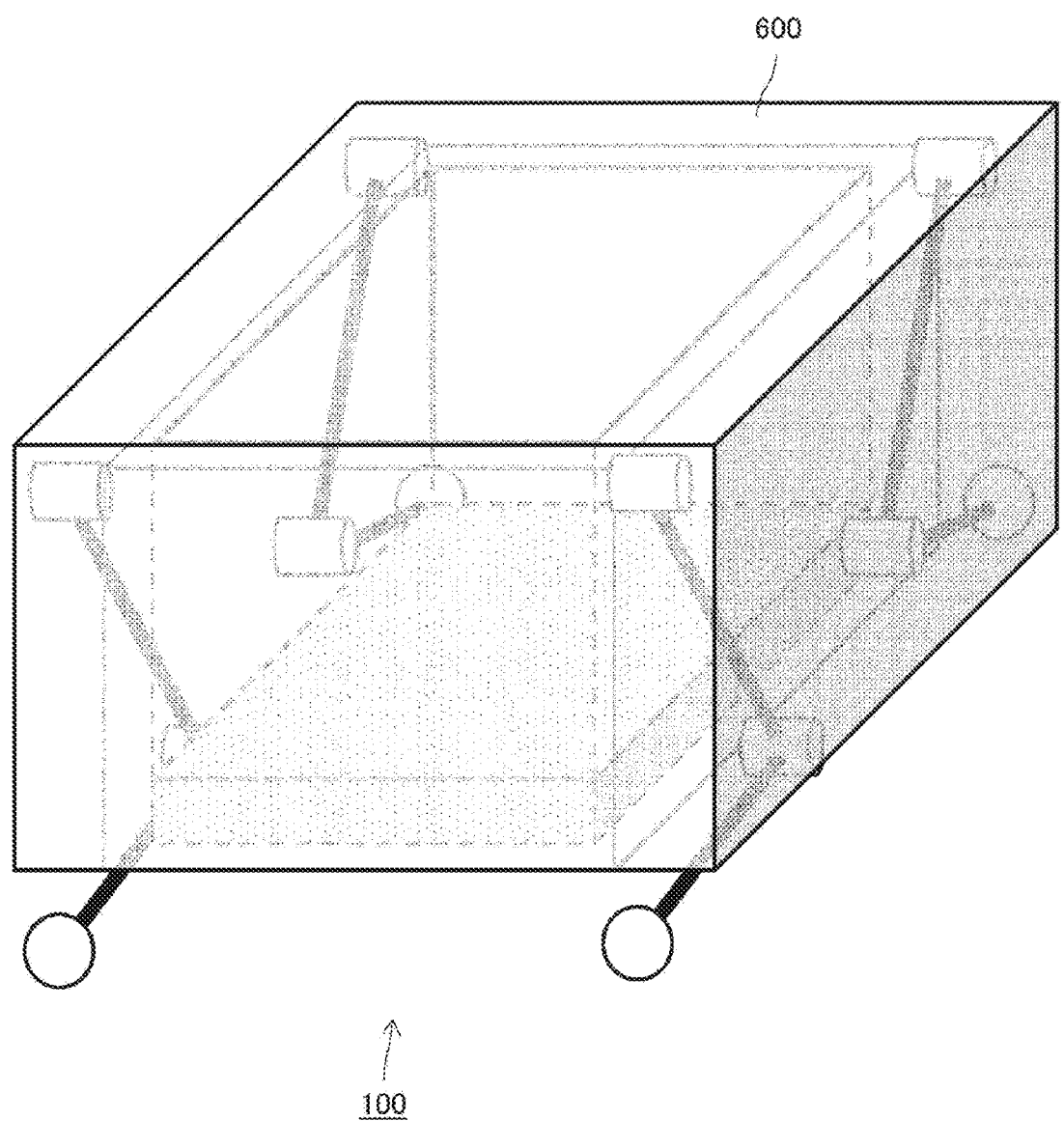
FIG. 6 is a diagram (perspective view) illustrating a state in which an outer casing 600 is attached to the robot device 100.
Figure 7:
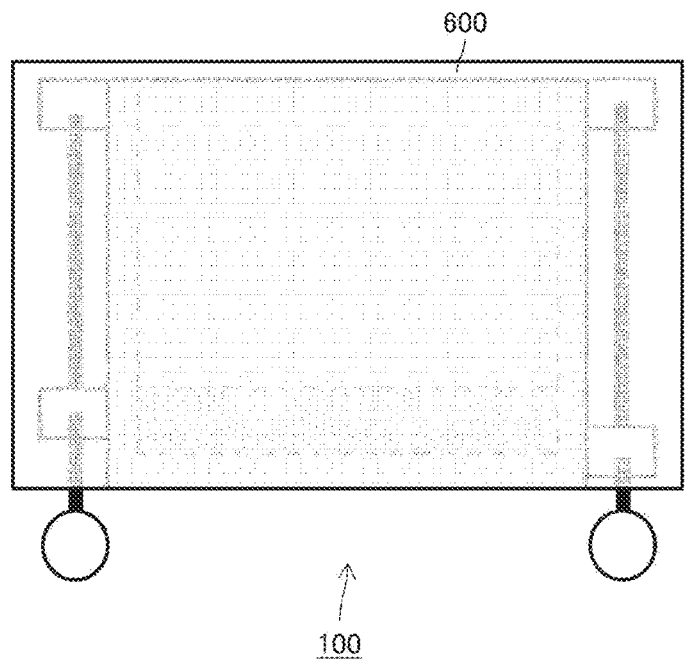
FIG. 7 is a diagram (front view) illustrating the state in which the outer casing 600 is attached to the robot device 100.
Figure 8:
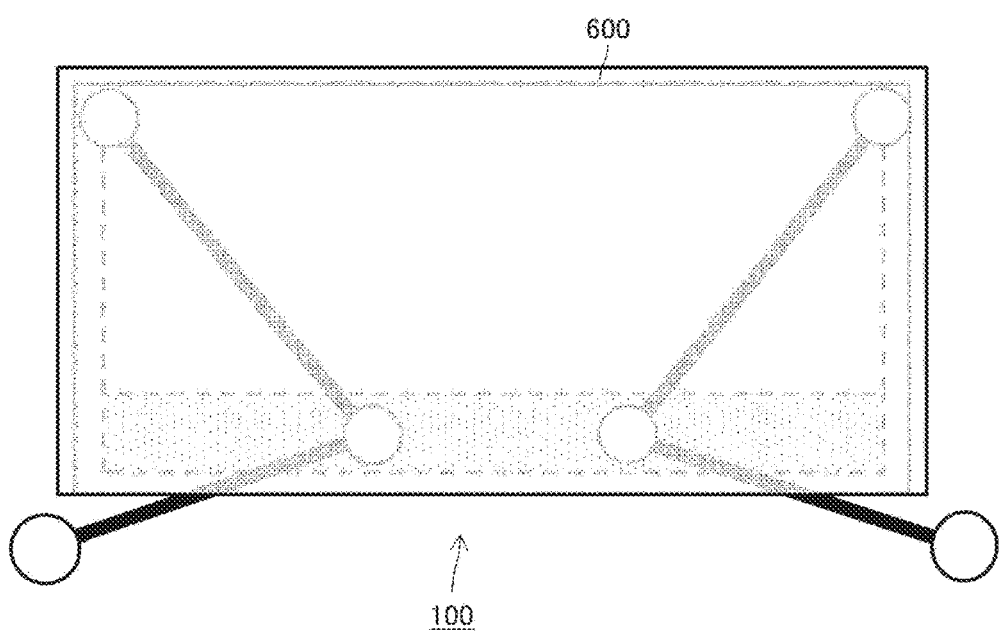
FIG. 8 is a diagram (top view) illustrating the state in which the outer casing 600 is attached to the robot device 100.
Figure 9:
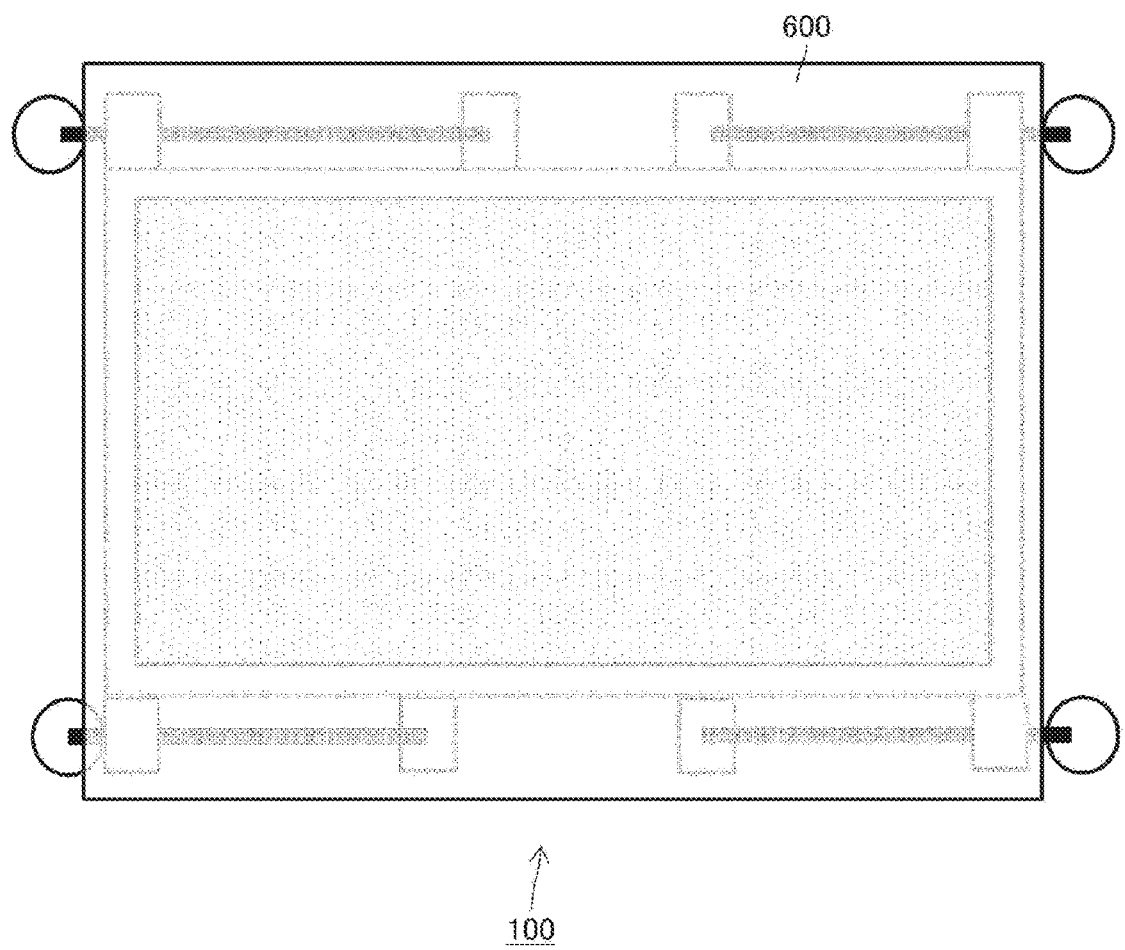
FIG. 9 is a diagram (left side view) illustrating the state in which the outer casing 600 is attached to the robot device 100.

FIGS. 6 to 9 illustrate a state in which an outer casing 600 is attached to the main body of the robot device 100. The outer casing 600 is drawn semi-transparently for convenience, but in practice, an opaque outer casing 600 is used so as not to affect the aesthetic appearance (alternatively, the outer casing 600 may be transparent to add a design accent). In these drawings, FIG. 6 is a perspective view of the robot device 100 to which the outer casing 600 is attached, which is viewed from the front left, FIG. 7 is a front view of the robot device 100, FIG. 8 is a left side view of the robot device 100, and FIG. 9 is a top view of the robot device 100.

In FIGS. 1 to 5, for convenience, each of the movable legs 110, 120, 130, and 140 is simplified and drawn as a multi-link structure including links and joints, but in practice, the exterior of each leg has a complicated shape, and considering entanglement of foreign matter, such as finger pinching, causes a big design constraint. Meanwhile, as illustrated in FIGS. 6 to 9, covering the entire robot device 100 including the movable legs 110, 120, 130, and 140 with the outer casing 600 obviates the need for considering the entanglement of foreign matter, such as finger pinching, by the movable legs 110, 120, 130, and 140, which increases design freedom. Furthermore, hiding the movable legs 110, 120, 130, and 140 each having the complicated exterior shape with the outer casing 600 offers an advantage of improving the aesthetic appearance of the robot device 100.

In FIGS. 6 to 9, the plain outer casing 600 is drawn for simplification, but applying removable decorations or the like to a wall surface of the outer casing 600 makes it possible to flexibly change the exterior design at low cost so as to appeal to the sensitivity of a user according to a request of the user. Alternatively, an advertising medium may be applied to the outer casing 600 instead of decorations.

Note that, in a case where the outer casing 600 is attached to the main body of the robot device 100, various methods for accessing the loading portion provided on the body portion 150 can be considered. For example, the following methods can be mentioned: a method of removing the outer casing 600 from the main body of the robot device 100 (a state in which the outer casing 600 is removed is similar to that in FIG. 1); a method of providing an openable/closable upper lid 1001 on the upper surface of the outer casing 600 (see FIG. 10); a method of providing an openable/closable front door 1101 on a front surface of the outer casing 600 (see FIG. 11); a method of providing an openable/closable rear door on a rear surface of the outer casing 600 (see FIG. 11); a method of providing an openable/closable side door 1201 on a left side surface (or right side surface) of the outer casing 600 (see FIG. 12); and the like.

FIGS. 1 to 12 illustrate the configuration examples of the robot device 100 including the four movable legs 110, 120, 130, and 140 each including the multi-link structure. The movable legs 110, 120, 130, and 140 each include the hip joint portion that connects to the body portion 150, the thigh link, the knee joint portion, and the lower leg link. However, the configuration of each movable leg is not limited to this. For example, it is possible to configure each movable leg by replacing the multi-link structure with a linear actuator mechanism.

Figure 30:
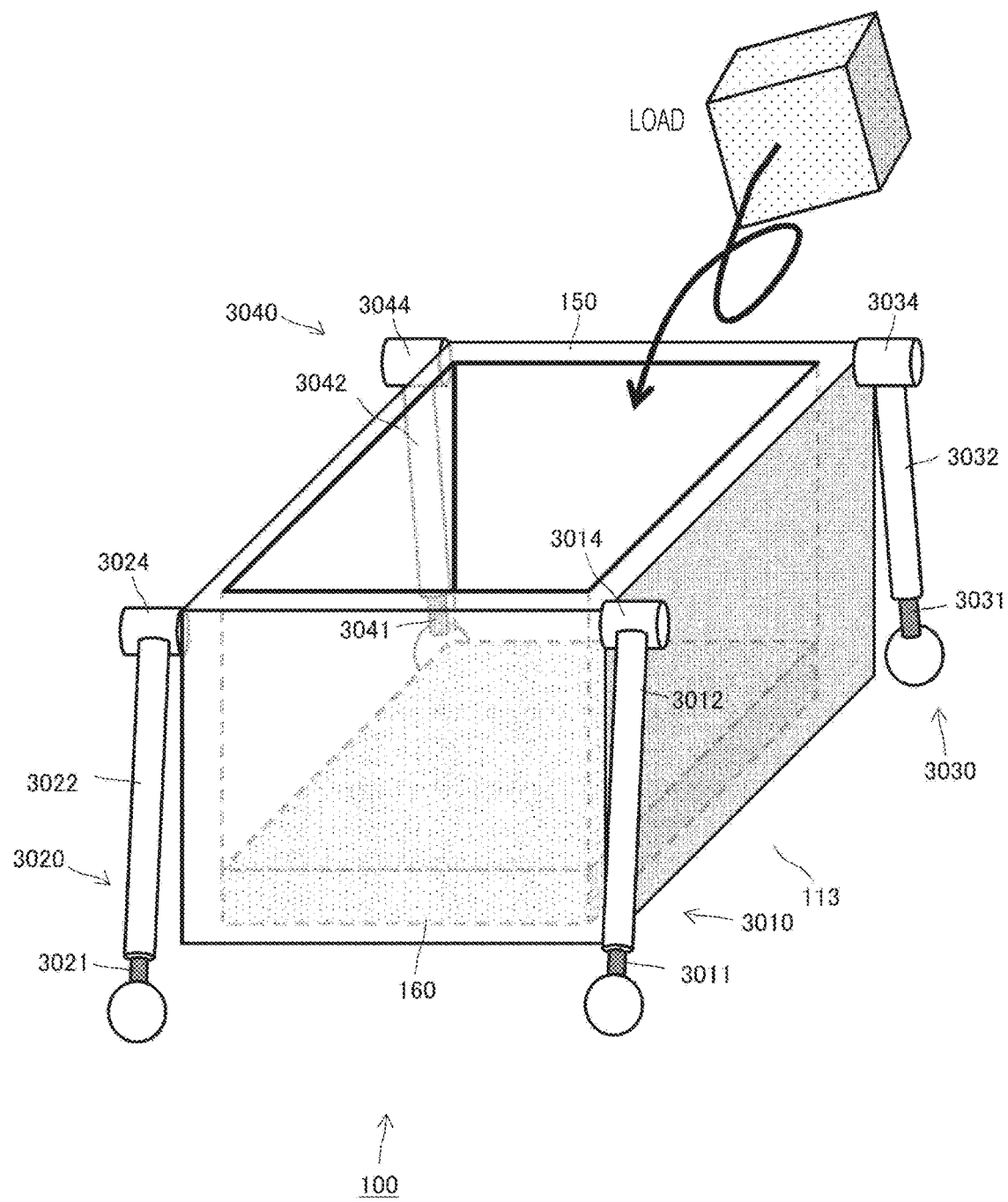
FIG. 30 is a diagram (perspective view) illustrating a configuration example of the robot device 100 including movable legs each having a linear actuator mechanism.
Figure 31:
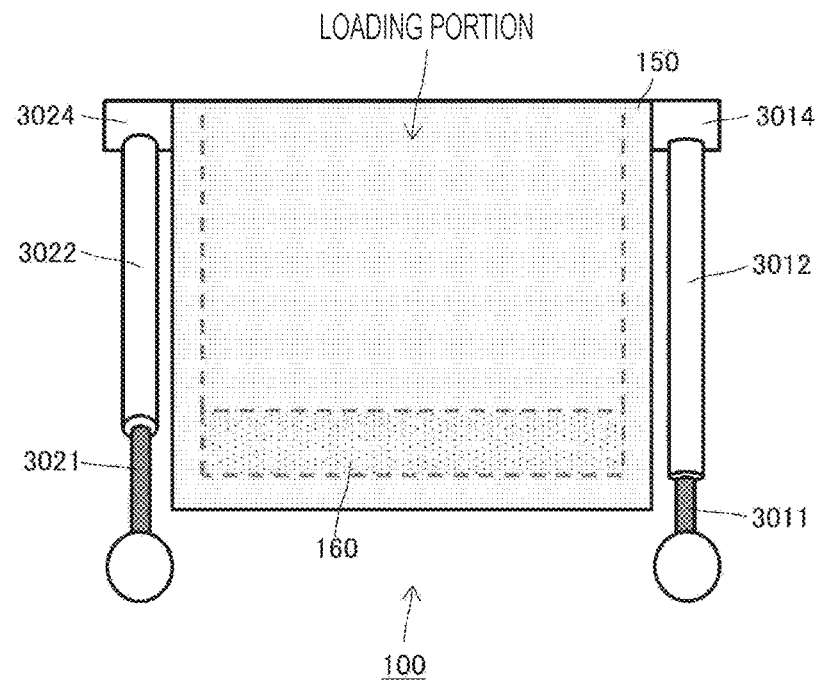
FIG. 31 is a diagram (front view) illustrating the configuration example of the robot device 100 including the movable legs each having the linear actuator mechanism.
Figure 32:
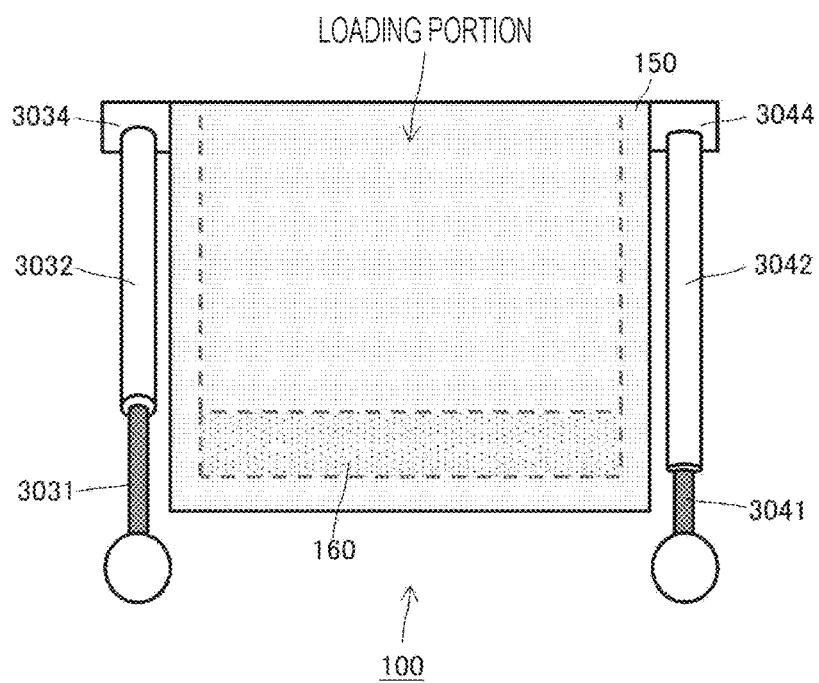
FIG. 32 is a diagram (rear view) illustrating the configuration example of the robot device 100 including the movable legs each having the linear actuator mechanism.
Figure 33:
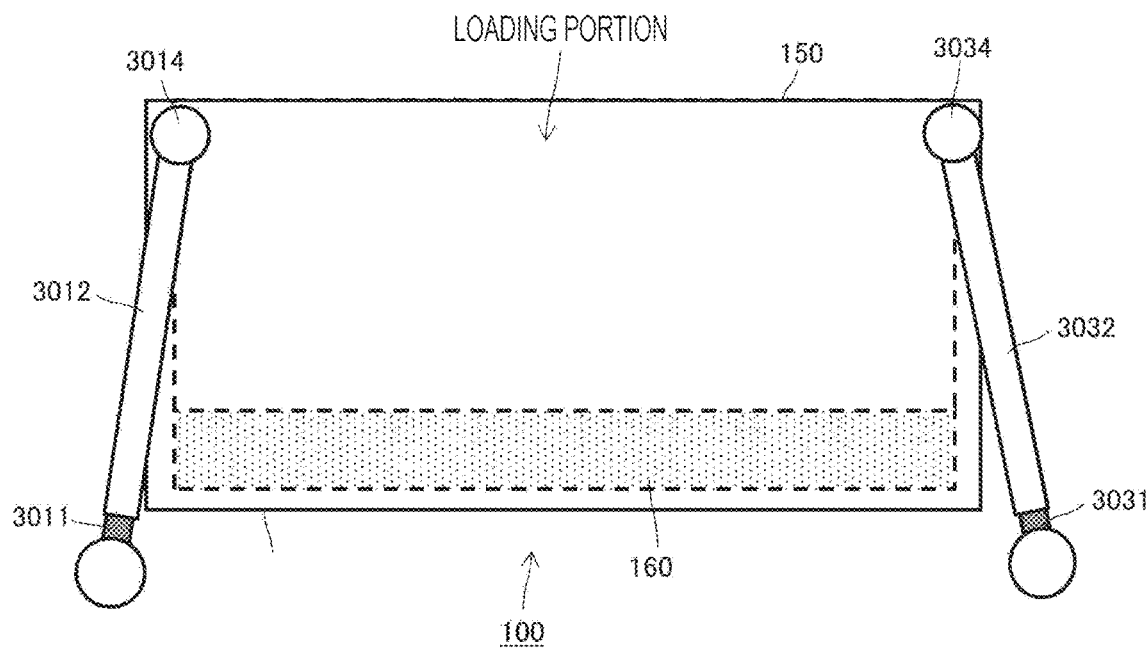
FIG. 33 is a diagram (left side view) illustrating the configuration example of the robot device 100 including the movable legs each having the linear actuator mechanism.
Figure 34:
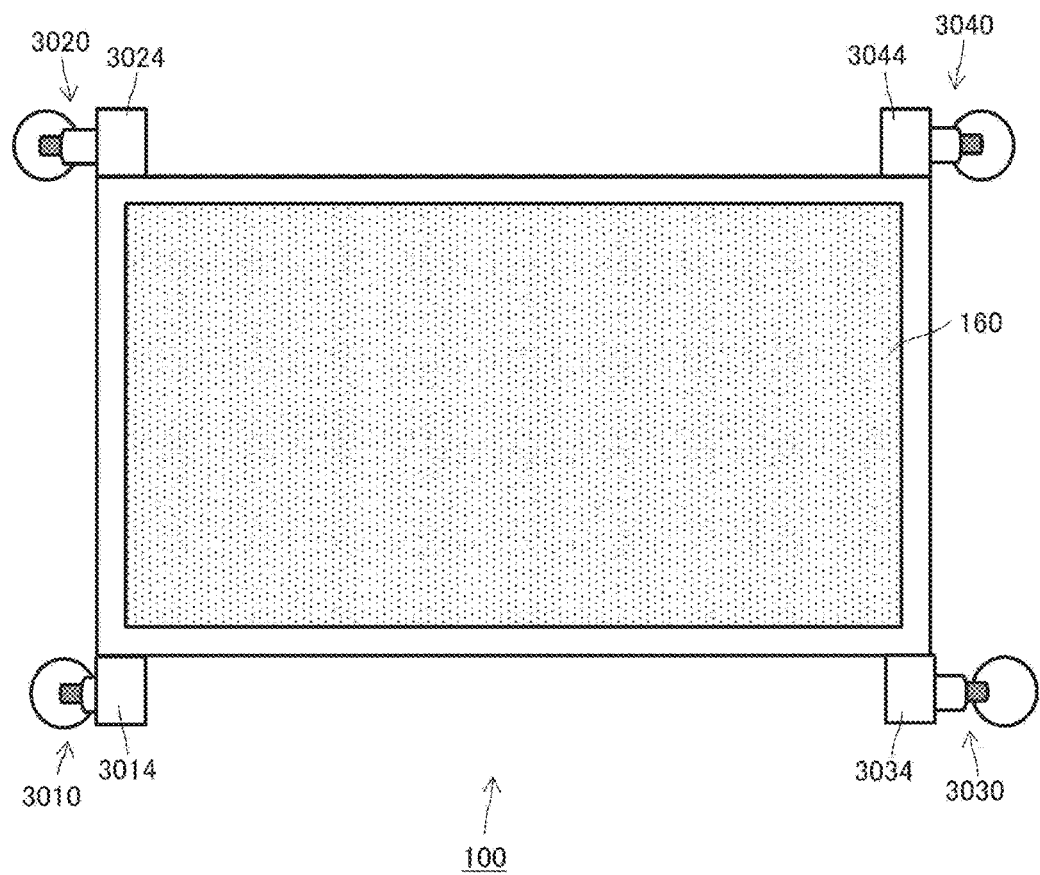
FIG. 34 is a diagram (top view) illustrating the configuration example of the robot device 100 including the movable legs each having the linear actuator mechanism.

FIGS. 30 to 34 schematically illustrate a configuration example of the robot device 100 including movable legs each having the linear actuator mechanism. In these drawings, FIG. 30 is a perspective view of the robot device 100 from the front left, FIG. 31 is a front view of the robot device 100, FIG. 32 is a rear view of the robot device 100, FIG. 33 is a left side view of the robot device 100, and FIG. 34 is a top view of the robot device 100.

The robot device 100 includes the body portion 150 of the walking robot and four movable legs 3010, 3020, 3030, and 3040 each connected to a corresponding one of the four corners of the body portion 150. The body portion 150 has the hollow box shape and serves as the loading portion for loading a load, and the load can be taken in and out through the opening on the upper surface or the like. It can be said that the structure is such that a load is placed in a space surrounded by the four movable legs 3010, 3020, 3030, and 3040. Furthermore, the controller 160 that houses the electric system such as the control circuit and the battery for driving is mounted on the bottom surface portion of the body portion 150. In addition, the leg 3010 is the left front leg (LF), the leg 3020 is the right front leg (RF), the leg 3030 is the left rear leg (LR), and the leg 3040 is the right rear leg (RR). The robot device 100 can walk by operating the legs 3010, 3020, 3030, and 3040 synchronously (while switching between the standing legs and the swing legs alternately).

The leg 3010 corresponding to the left front leg includes a cylinder 3012 having a hollow cylindrical shape and a rod 3011 that is extendable from and retractable into the cylinder 3012. In the cylinder 3012, a linear actuator that drives the rod 3011 in a longitudinal direction by using hydraulic pressure, air pressure, a ball screw, or the like is arranged. The total length of the leg 3010 changes according to the drive position of the rod 3011. The lower end of the rod 3011 corresponding to the lower leg portion corresponds to a toe. Furthermore, the upper end of the cylinder 3012 corresponding to a thigh portion is attached to the body portion 150 via a hip joint portion 3014. The hip joint portion 3014 has a degree of freedom of rotation around the pitch axis, and can drive the entire leg 3010 around the pitch axis with respect to the body portion 150 by an actuator (not illustrated) such as a pitch axis rotation motor.

Furthermore, the leg 3020 corresponding to the right front leg includes a cylinder 3022 having a hollow cylindrical shape and a rod 3021 that is extendable from and retractable into the cylinder 3022. In the cylinder 3022, a linear actuator that drives the rod 3021 in the longitudinal direction is arranged, and the total length of the leg 3020 changes according to the drive position of the rod 3021. The lower end of the rod 3021 corresponding to the lower leg portion corresponds to a toe. Furthermore, the upper end of the cylinder 3022 corresponding to a thigh portion is attached to the body portion 150 via a hip joint portion 3024. The hip joint portion 3024 has a degree of freedom of rotation around the pitch axis, and can drive the entire leg 3020 around the pitch axis with respect to the body portion 150 by an actuator (not illustrated) such as a pitch axis rotation motor.

Furthermore, the leg 3030 corresponding to the left rear leg includes a cylinder 3032 having a hollow cylindrical shape and a rod 3031 that is extendable from and retractable into the cylinder 3032. In the cylinder 3032, a linear actuator that drives the rod 3031 in the longitudinal direction is arranged, and the total length of the leg 3030 changes according to the drive position of the rod 3031. The lower end of the rod 3031 corresponding to the lower leg portion corresponds to a toe. Furthermore, the upper end of the cylinder 3032 corresponding to a thigh portion is attached to the body portion 150 via a hip joint portion 3034. The hip joint portion 3034 has a degree of freedom of rotation around the pitch axis, and can drive the entire leg 3030 around the pitch axis with respect to the body portion 150 by an actuator (not illustrated) such as a pitch axis rotation motor.

Furthermore, the leg 3040 corresponding to the right rear leg includes a cylinder 3042 having a hollow cylindrical shape and a rod 3041 that is extendable from and retractable into the cylinder 3042. In the cylinder 3042, a linear actuator that drives the rod 3041 in the longitudinal direction is arranged, and the total length of the leg 3040 changes according to the drive position of the rod 3041. The lower end of the rod 3041 corresponding to the lower leg portion corresponds to a toe. Furthermore, the upper end of the cylinder 3042 corresponding to a thigh portion is attached to the body portion 150 via a hip joint portion 3044. The hip joint portion 3044 has a degree of freedom of rotation around the pitch axis, and can drive the entire leg 3040 around the pitch axis with respect to the body portion 150 by an actuator (not illustrated) such as a pitch axis rotation motor.

The movable legs 3010, 3020, 3030, and 3040 each have two degrees of freedom, that is, the degree of freedom of linear motion and the degree of freedom of rotation around the pitch axis of the hip joint, and the entire robot device 100 has eight degrees of freedom. Although the robot device 100 illustrated in FIG. 1 includes four legs, it should be understood that the technology according to the present disclosure can be applied even if the robot device 100 is equipped with two legs, three legs, or five or more legs.

Figure 13:
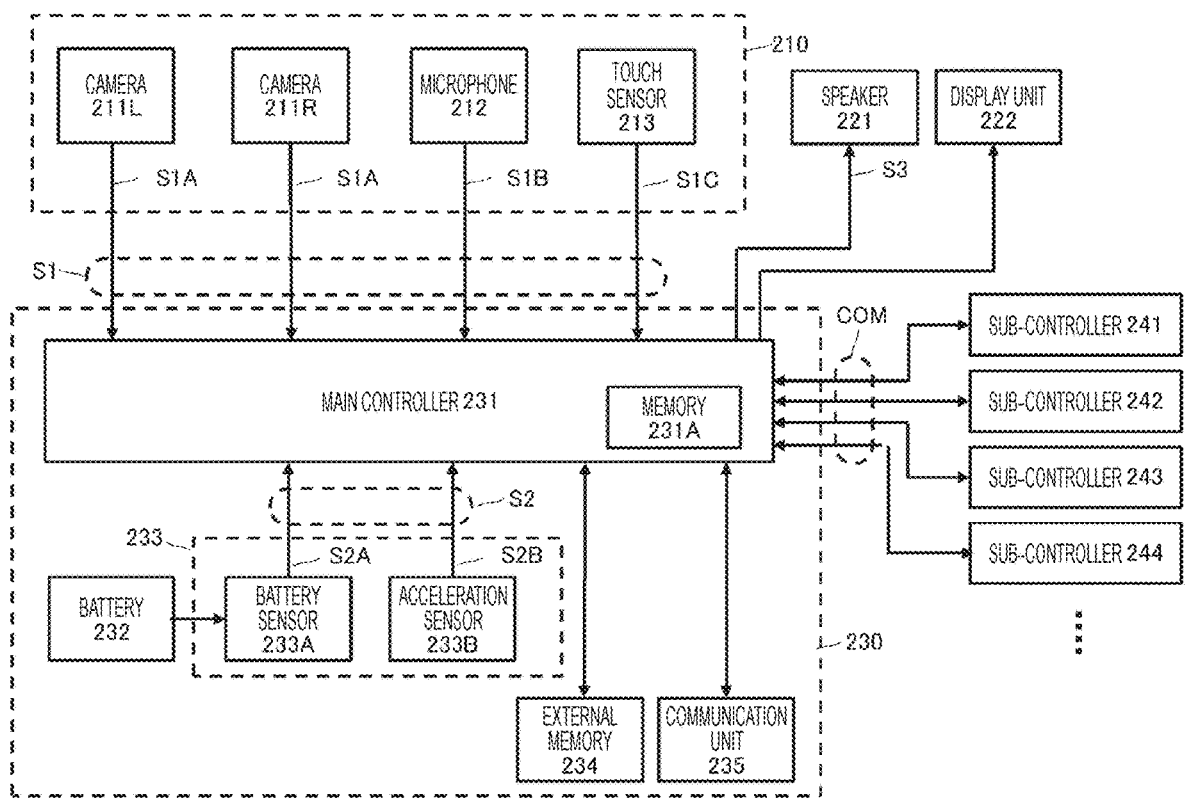
FIG. 13 is a diagram illustrating a configuration example of an electric system of the robot device 100.

FIG. 13 illustrates a configuration example of the electric system of the robot device 100.

The robot device 100 includes an external sensor unit 210 in which cameras 211L and 211R that function as left and right "eyes" of the robot device 100, a microphone 212 that functions as an "ear", a touch sensor 213, and the like are each arranged at a predetermined position. For each of the cameras 211L and 211R, for example, a camera including an image sensor such as a complementary metal oxide semiconductor (CMOS) or a charge coupled device (CCD) is used.

Note that the external sensor unit 210 may further include another sensor, which is not illustrated. For example, the external sensor unit 210 includes torque sensors that each detect the rotational torque acting on the first and second joints of a corresponding one of the legs 110, 120, 130, and 140, encoders that each detect the joint angle, sole sensors that each measure the floor reaction force acting on a sole of a corresponding one of the legs 110, 120, 130, and 140, and the like. Each sole sensor includes, for example, a six degrees of freedom (DOF) force sensor and the like. Alternatively, the external sensor unit 210 includes torque sensors that each detect the torque acting on a corresponding one of the movable legs 3010, 3020, 3030, and 3040, encoders that each detect the amount of longitudinal movement of a corresponding one of the rods 3011, 3021, 3031, and 3041, sole sensors for the movable leg 3010, 3020, 3030, and 3040, and the like.

Furthermore, the external sensor unit 210 may include a sensor capable of measuring or estimating the direction and distance of a predetermined target, such as laser imaging detection and ranging (LIDAR), a time of flight (TOF) sensor, or a laser range sensor. In addition, the external sensor unit 210 may include a global positioning system (GPS) sensor, an infrared sensor, a temperature sensor, a humidity sensor, an illuminance sensor, and the like.

Furthermore, the external sensor unit 210 may include an ambient observation sensor (described later) attached to the outer casing 600 or the like. The ambient observation sensor includes, for example, an infrared sensor, a capacitive human detection sensor, a tactile sensor, an air pressure sensor, and the like.

Furthermore, in the robot device 100, a speaker 221, a display unit 222, and the like as output units are each arranged at a predetermined position. The speaker 221 functions to output voice and provide voice guidance, for example. Furthermore, the display unit 222 displays the state of the robot device 100 and a response to the user.

In a control unit 230, a main controller 231, a battery 232, an internal sensor unit 233 including a battery sensor 233A, an acceleration sensor 233B, and the like, an external memory 234, and a communication unit 235 are arranged.

The cameras 211L and 211R of the external sensor unit 210 capture an image of the surrounding conditions and send an obtained image signal S1A to the main controller 231. The microphone 212 collects voice input from the user and sends an obtained voice signal S1B to the main controller 231. The input voice given to the robot device 100 by the user includes a start word, various command voices (voice commands) such as "walk", "turn right", "hurry", and "stop", and the like. Note that, although only one microphone 82 is drawn in FIG. 2, two or more microphones like left and right ears may be provided to estimate a sound source direction.

Furthermore, the touch sensor 213 of 210 of the external sensor unit is laid, for example, on a placement surface of the loading portion, detects the pressure received at the place where a load is placed, and sends the detection result to the main controller 231 as a pressure detection signal S1C.

The battery sensor 233A of the internal sensor unit 233 detects the remaining energy of the battery 232 at predetermined cycles, and sends the detection result as a battery remaining amount detection signal S2A to the main controller 231.

The acceleration sensor 233B detects the acceleration in three axial directions (x (roll) axis, y (pitch) axis, and z (yaw) axis) for the movement of the robot device 100 at predetermined cycles, and sends the detection result as an acceleration detection signal S2B to the main controller 231. The acceleration sensor 233B may be, for example, an inertial measurement unit (IMU) equipped with a triaxial gyro, a tri-directional acceleration sensor, and the like. It is possible to measure the angle and acceleration of the main body of the robot device 100 with the IMU.

The external memory 234 stores programs, data, control parameters, and the like, and supplies the programs and data to a memory 231A built in the main controller 231 as needed. Furthermore, the external memory 234 receives data and the like from the memory 231A and stores the data and the like. Note that the external memory 234 may be configured as a cartridge-type memory card such as an SD card, for example, and may be detachable from the main body (or the control unit 230) of the robot device 100.

The communication unit 235 performs data communication with the outside on the basis of a communication method such as Wi-Fi (registered trademark) or Long Term Evolution (LTE), for example. For example, a program such as an application executed by the main controller 231 and data required for executing the program can be acquired from the outside via the communication unit 235.

The main controller 231 includes the built-in memory 231A. The memory 231A stores programs and data, and the main controller 231 executes the programs stored in the memory 231A to perform various types of processing. That is, the main controller 231 determines the surrounding and internal conditions of the robot device 100, the commands from the user, the presence or absence of an action from the user, and the like on the basis of the image signal S1A, the voice signal S1B, and the pressure detection signal S1C (hereinafter, these are collectively referred to as an external sensor signal S1) supplied respectively from the cameras 211L and 211R, the microphone 212, and the touch sensor 213 of the external sensor unit 210 and the battery remaining amount detection signal S2A and the acceleration detection signal S2B (hereinafter, these are collectively referred to as an internal sensor signal S2) supplied respectively from the battery sensor 233A and the acceleration sensor 233B of the internal sensor unit 233. Note that the memory 231A may store information regarding the weight and the position of the center of gravity of the main body of the robot device 100 in advance.

The main controller 231 then decides an action of the robot device 100 or an expression action to be activated for the user on the basis of the determination result of the surrounding and internal conditions of the robot device 100, the commands from the user, or the presence or absence of the action from the user and the control programs stored in advance in the internal memory 231A or various control parameters stored in the external memory 234 loaded at that time, generates control commands based on the decision result, and sends the control commands to sub-controllers 241, 242, and the like.

The sub-controllers 241, 242, and the like are each in charge of operation control of a corresponding one of subsystems in the robot device 100, and drive the subsystems on the basis of the control commands supplied from the main controller 231. The movable legs 110, 120, 130, and 140 (or the movable legs 3010, 3020, 3030, and 3040) described above correspond to the subsystems, and are driven and controlled by the sub-controllers 241, 242, 243, 244, and the like, respectively. In this embodiment, it is assumed that there is an interaction between the robot device 100 and a human, for example, when a load or the like is transported, and force control is applied to the control of the movable legs 110, 120, 130, and 140 (or the movable legs 3010, 3020, 3030, and 3040).

B. Stability of Robot Device

Subsequently, the relationship between the movable legs 110, 120, 130, and 140 and the body portion 150 in the robot device illustrated in FIGS. 1 to 12 will be described. In the description, it is assumed that the movable legs 110, 120, 130, and 140 have symmetrical shapes in the left and right direction or the front and rear direction, are configured with the same dimensions and shape, and are attached to the body portion 150 at symmetrical positions in the left and right direction or the front and rear direction, and here, the relationship between the movable leg 110 and the body portion 150 will be described as a representative.

Figure 14:
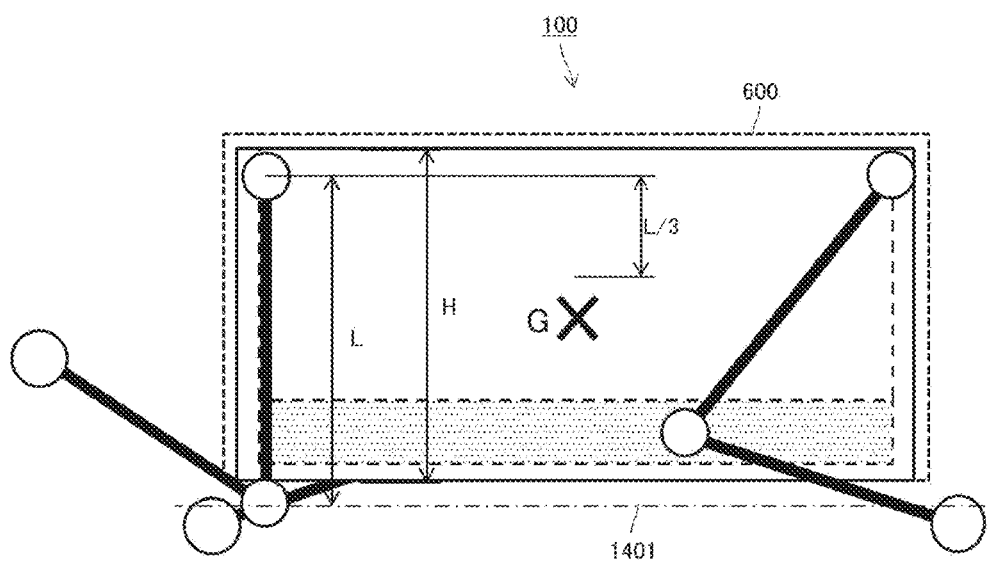
FIG. 14 is a diagram for describing the relationship between a movable leg and a body portion.

The movable leg 110 is connected via the hip joint portion 114 in the vicinity of the upper end of the body portion 150. The length of the thigh link 112 (or the distance between the hip joint link 114 and the knee joint 113) is L (the same applies to the other movable legs 120, 130, and 140). The distance L corresponds to the total length when the movable leg 110 is bent (or shortened to the maximum). In the example illustrated in FIG. 14, the thigh link 112 of the movable leg 110 is in a vertically downward posture. As can be seen from the drawing, the bottom surface of the body portion 150 is in the vicinity of the knee joint 113 or higher than the knee joint 113. In other words, if the height from the bottom surface of the body portion 150 to the vicinity of the hip joint portion 114 is H, L>H is established. It can also be said that the bottom surface of the body portion 150 is set higher than a ground plane when the movable leg 110 shortened to the maximum is in the vertically downward posture.

Furthermore, the body portion 150 (the outer casing 600 is also included) is configured such that a center of gravity G of the body portion 150 is arranged below one-third of the distance L between the hip joint 114 and the knee joint 113. If the center of gravity G of the body portion 150 is arranged below half the distance between the hip joint 114 and the knee joint 113, the posture of the robot device 100 is further stabilized. As described above, the body portion 150 has the hollow box shape, includes the loading portion for loading a load, and has a structure in which the load is placed in the space surrounded by the four movable legs 110, 120, 130, and 140. Therefore, it is possible to secure the maximum storage space for a load. When a load is placed, the position of the center of gravity of the weight of the body portion 150 including the load is further lowered, and the posture of the robot device 100 is further stabilized. The body portion 150 is also a container on which a load is placed, and thus may be manufactured in a structure having strength.

With such a structure, the center of gravity of the legged robot device 100 can be lowered. Furthermore, even if a load is placed on the robot device 100, the legs do not spread outward unlike a robot described in Patent Document 2, and compactness can be achieved.

In addition, a structure is adopted in which the bottom surface of the body portion 150 is arranged above a plane 1401 arranged at the distance L between the hip joint 114 and the knee joint 113 when the thigh link 112 of the movable leg 110 is in the vertically downward posture. Therefore, it is possible to avoid interference between the bottom surface of the body portion 150 and the floor surface when the robot device 100 traverses a rough ground or stairs while the maximum space is secured for the loading portion for loading an object.

Summarizing the above description, the following two requirements are required to secure the stability of the robot device 100.

(1) The length L when the movable leg is shortened to the maximum>the height H of the body portion.

(2) The center of gravity G of the body portion is arranged below one-third of the length L when the movable leg is shortened to the maximum.

The stability of the robot device 100 including the movable legs each having the linear actuator mechanism, which is illustrated in FIGS. 30 to 34, will also be considered.

Figure 35:
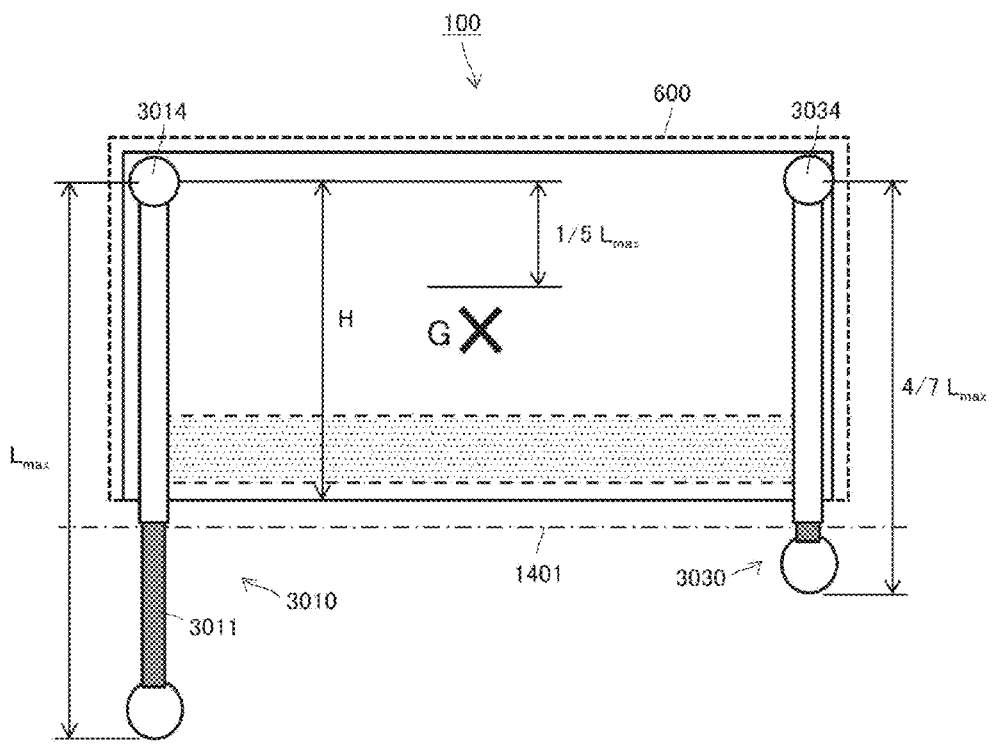
FIG. 35 is a diagram for describing the relationship between a movable leg and the body portion.

The movable leg 3010 is connected via the hip joint portion 3014 in the vicinity of the upper end of the body portion 150. The maximum length of the movable leg 3010, in which the rod 3011 is extended to the maximum from the cylinder 3012, is $L_{max}$, and the length of the movable leg 3010 when the rod 3011 is stored in the cylinder 3012 as much as possible and the movable leg 3010 is shortened to the maximum is $4/7 L_{max}$ (the same applies to the other movable legs 3020, 3030, and 304). In the example shown in FIG. 35, each of the movable legs 3010 and 3030 is in a vertically downward posture. As can be seen from the drawing, the bottom surface of the body portion 150 is higher than the toe of the movable leg 3030 when the movable leg 3030 is shortened to the maximum. Therefore, if the height from the bottom surface of the body portion 150 to the vicinity of the hip joint portion 3034 is H, $4/7 L_{max} > H$ is established. The bottom surface of the body portion 150 is arranged higher than a ground plane when the movable leg 3030 shortened to the maximum is in the vertically downward posture.

Furthermore, the body portion 150 (the outer casing 600 is also included) is configured such that the center of gravity of the body portion 150 is arranged below one-fifth of the maximum length $L_{max}$ of the movable leg 3010. If the center of gravity G is arranged further downward, the posture of the robot device 100 is further stabilized. As described above, the body portion 150 has the hollow box shape, includes the loading portion for loading a load, and has a structure in which the load is placed in the space surrounded by the four movable legs 110, 120, 130, and 140. Therefore, it is possible to secure the maximum storage space for a load. When a load is placed, the position of the center of gravity of the weight of the body portion 150 including the load is further lowered, and the posture of the robot device 100 is further stabilized. The body portion 150 is also a container on which a load is placed, and thus may be manufactured in a structure having strength.

With such a structure, the center of gravity of the legged robot device 100 can be lowered. Furthermore, even if a load is placed on the robot device 100, the legs do not spread outward unlike the robot described in Patent Document 2, and compactness can be achieved.

C. Safety of Robot Device

As illustrated in FIGS. 6 to 9, the outer casing 600 is attached to the main body of the robot device 100 including the body portion 150 and the four movable legs 110, 120, 130, and 140 attached so as to surround the body portion 150.

Each of the movable legs 110, 120, 130, and 140 is simplified and drawn, but in practice, the exterior of each leg has a complicated shape, and considering entanglement of foreign matter, such as finger pinching, causes a big design constraint. Meanwhile, as illustrated in FIGS. 6 to 9, covering the entire robot device 100 including the movable legs 110, 120, 130, and 140 with the outer casing 600 makes it possible to reliably prevent foreign matter from being entangled in the movable legs 110, 120, 130, and 140, such as finger pinching.

Figure 15:
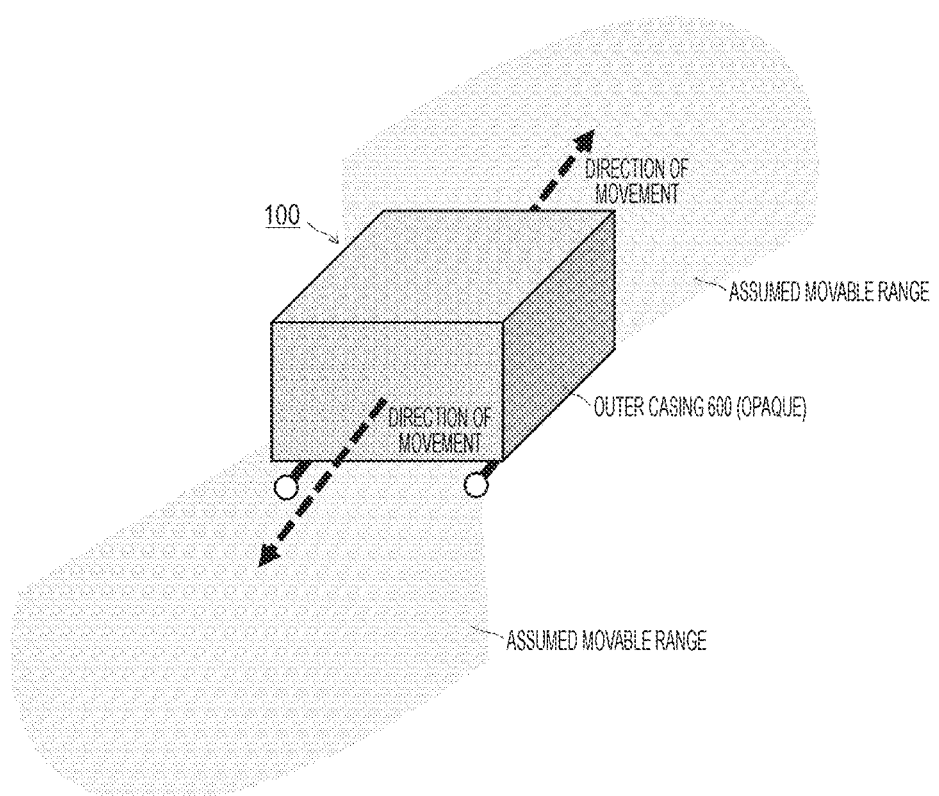
FIG. 15 is a diagram (perspective view) illustrating a state in which an opaque outer casing 600 is attached to the robot device 100.

In FIGS. 6 to 9, the outer casing 600 is drawn semi-transparently for convenience. In practice, the opaque outer casing 600 is used, as illustrated in FIG. 15, so as not to affect the aesthetic appearance. In this case, the robot device 100 is a rectangular parallelepiped in which only the toes peep from the bottom, and a human observing the robot device 100 in the surroundings can intuitively understand that the robot device 100 moves in a longitudinal direction of the rectangular parallelepiped. That is, since the human can see at a glance a movable range assumed in a case where the robot device 100 moves forward and backward, it is easy to grasp a range in which the human can approach the robot device 100.

D. Rigidity of Robot Device

Figure 10:
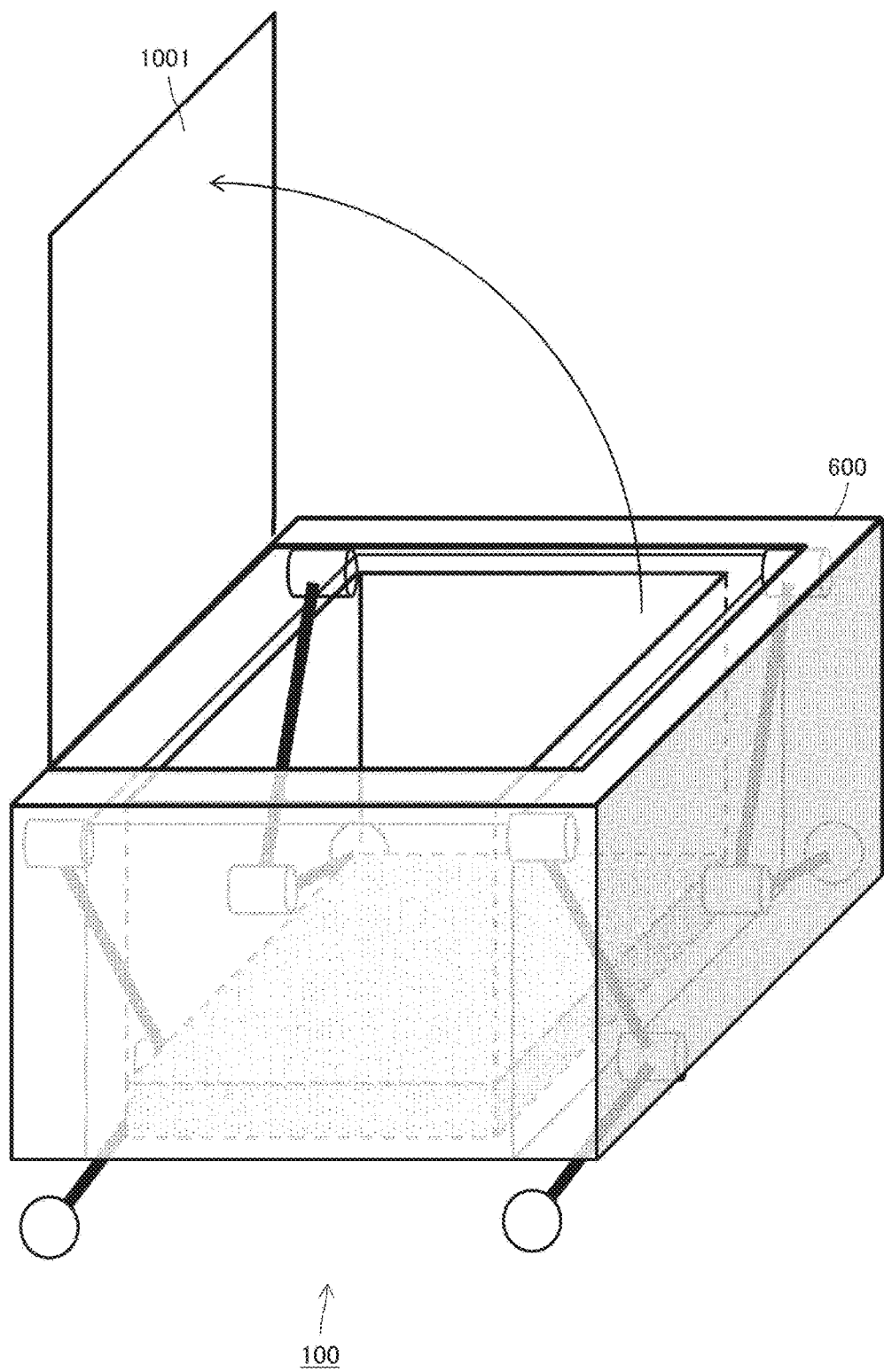
FIG. 10 is a diagram illustrating a state in which an openable/closable lid is attached to an upper surface of the outer casing 600 of the robot device 100.
Figure 11:
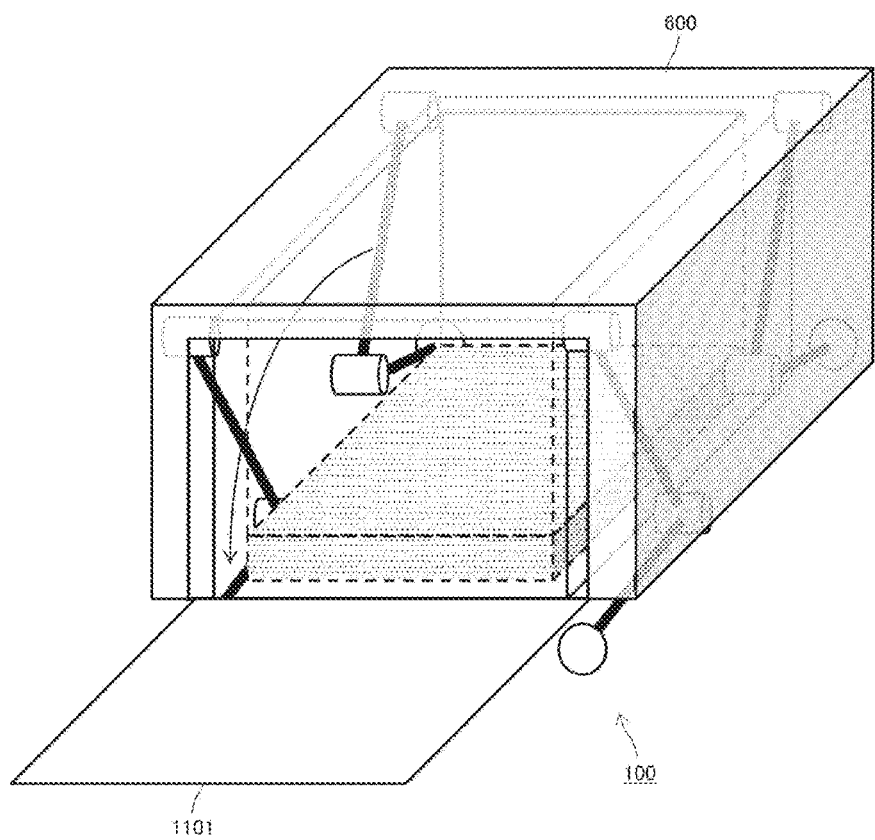
FIG. 11 is a diagram illustrating a state in which an openable/closable front door is attached to a front surface of the outer casing 600 of the robot device 100.
Figure 12:
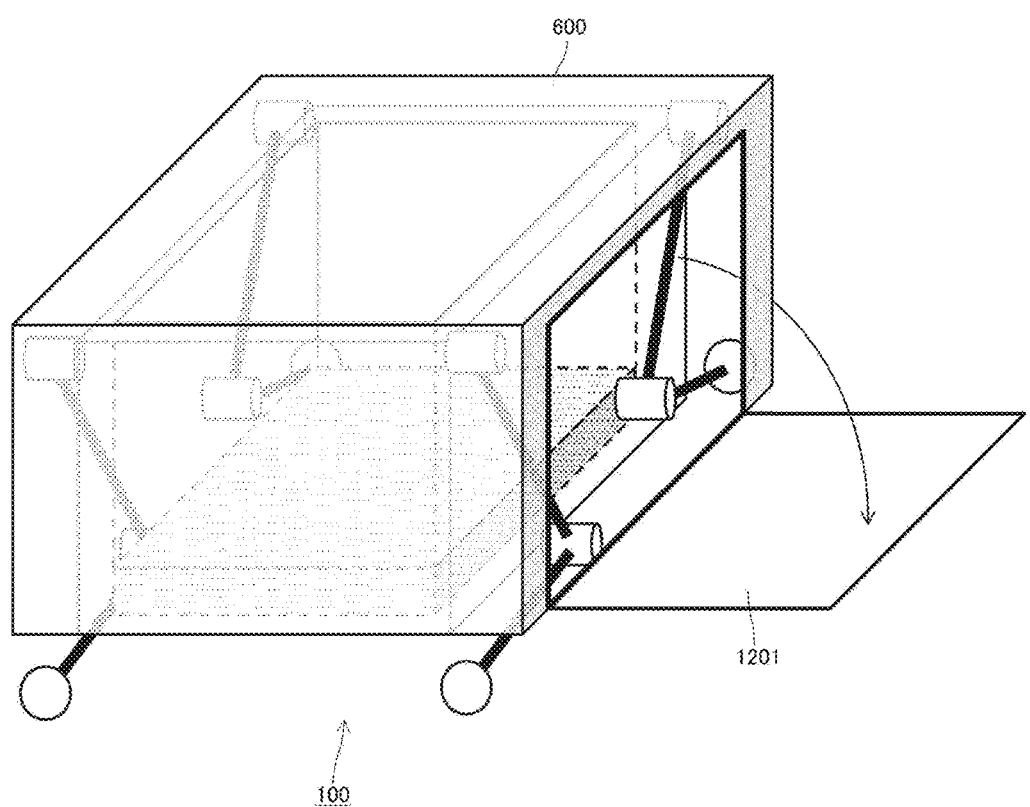
FIG. 12 is a diagram illustrating a state in which an openable/closable side door is attached to a left side surface of the outer casing 600 of the robot device 100.

As illustrated in FIGS. 10 to 12, arranging the openable/closable lid or door on the upper surface, front surface, rear surface, side surface, or the like of the outer casing 600 attached to the main body of the robot device 100 makes it easier to load a load on the loading portion of the body portion 150 and to unload the load therefrom. Although FIGS. 10 to 12 illustrate the examples in which the lid or door is arranged at one place, lids or doors may be arranged at two or more places.

Figure 16:
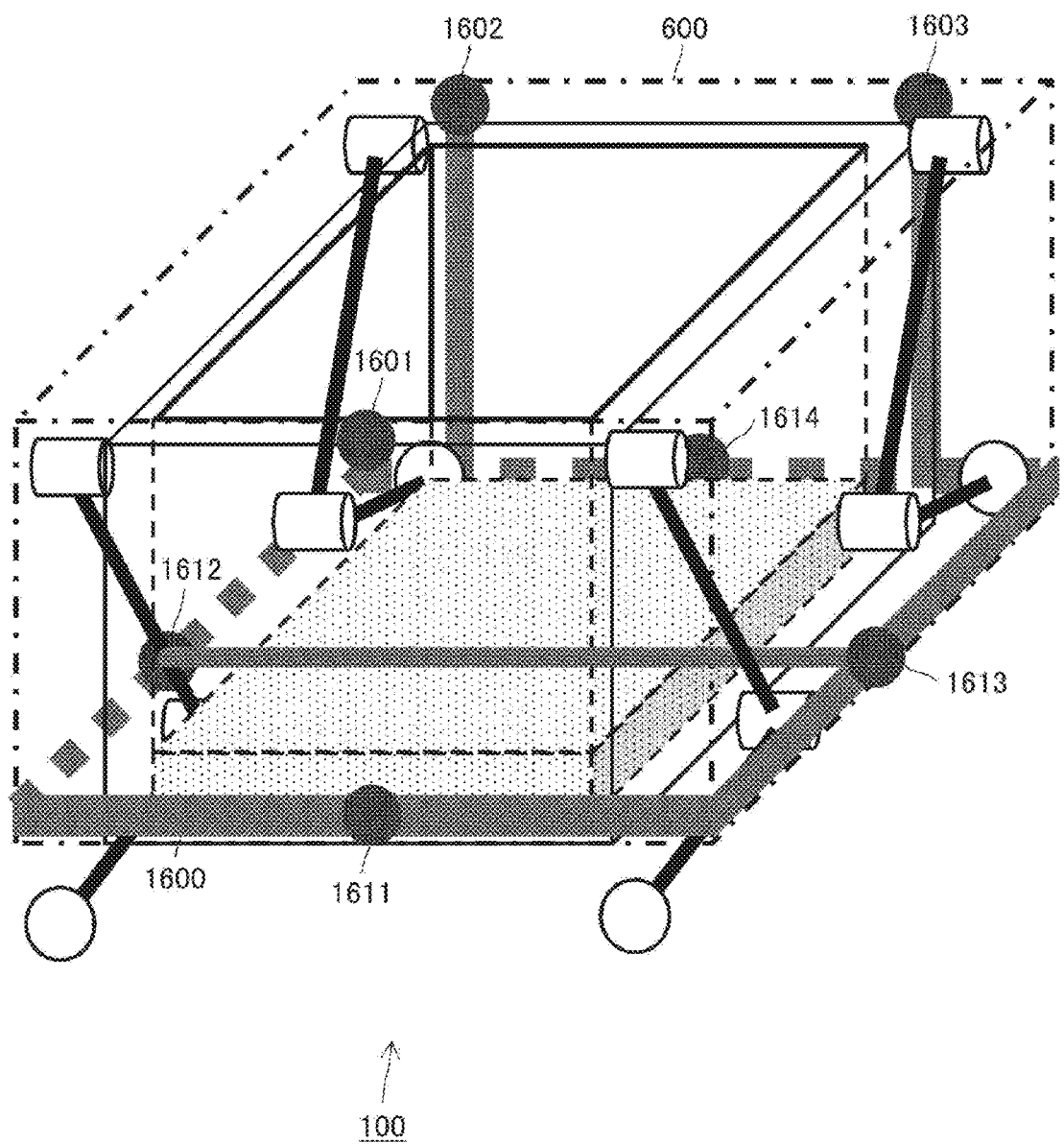
FIG. 16 is a diagram (perspective view) illustrating a connection structure between the body portion and the outer casing.
Figure 17:
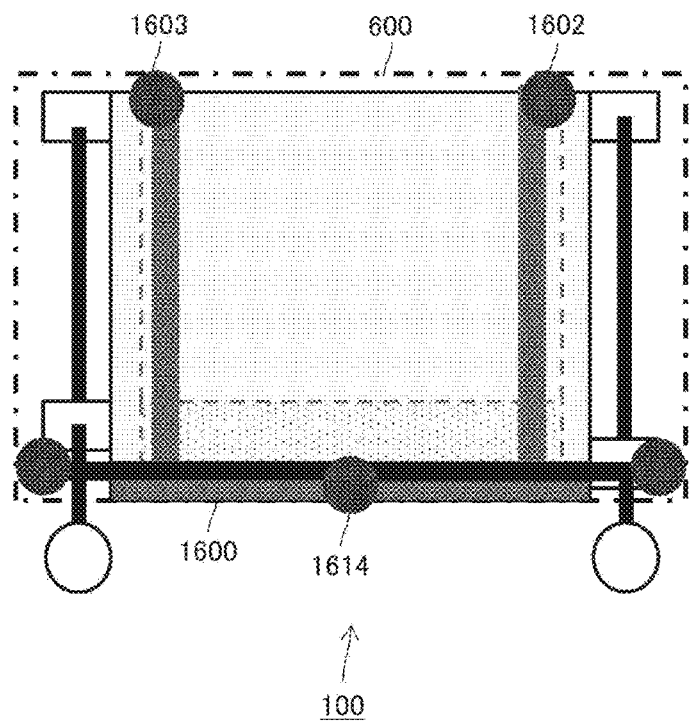
FIG. 17 is a diagram (rear view) illustrating the connection structure between the body portion and the outer casing.
Figure 18:
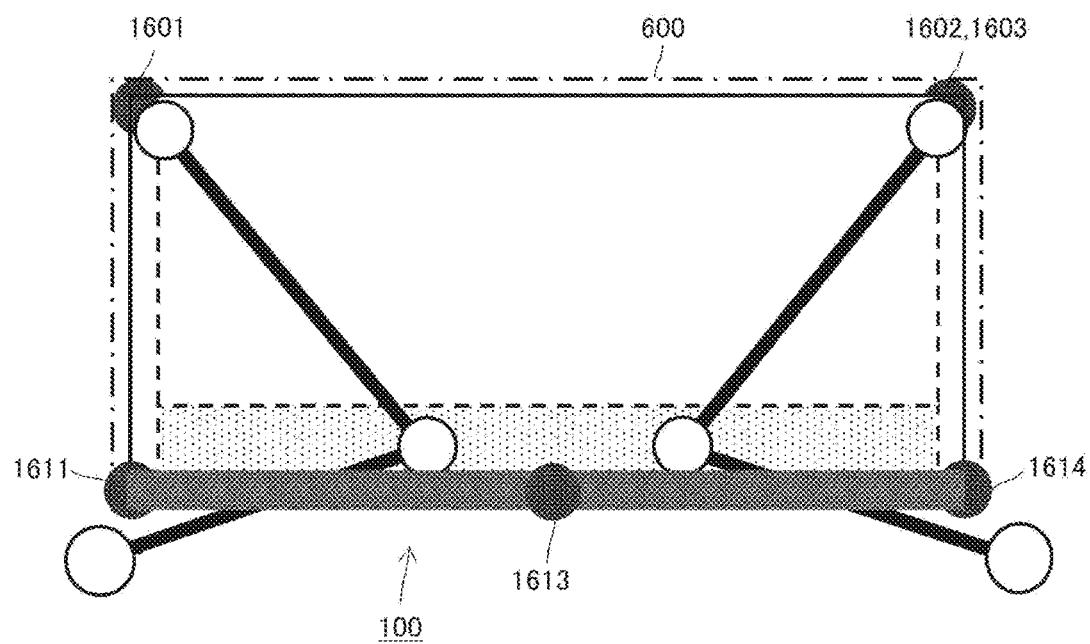
FIG. 18 is a diagram (left side view) illustrating the connection structure between the body portion and the outer casing.
Figure 19:
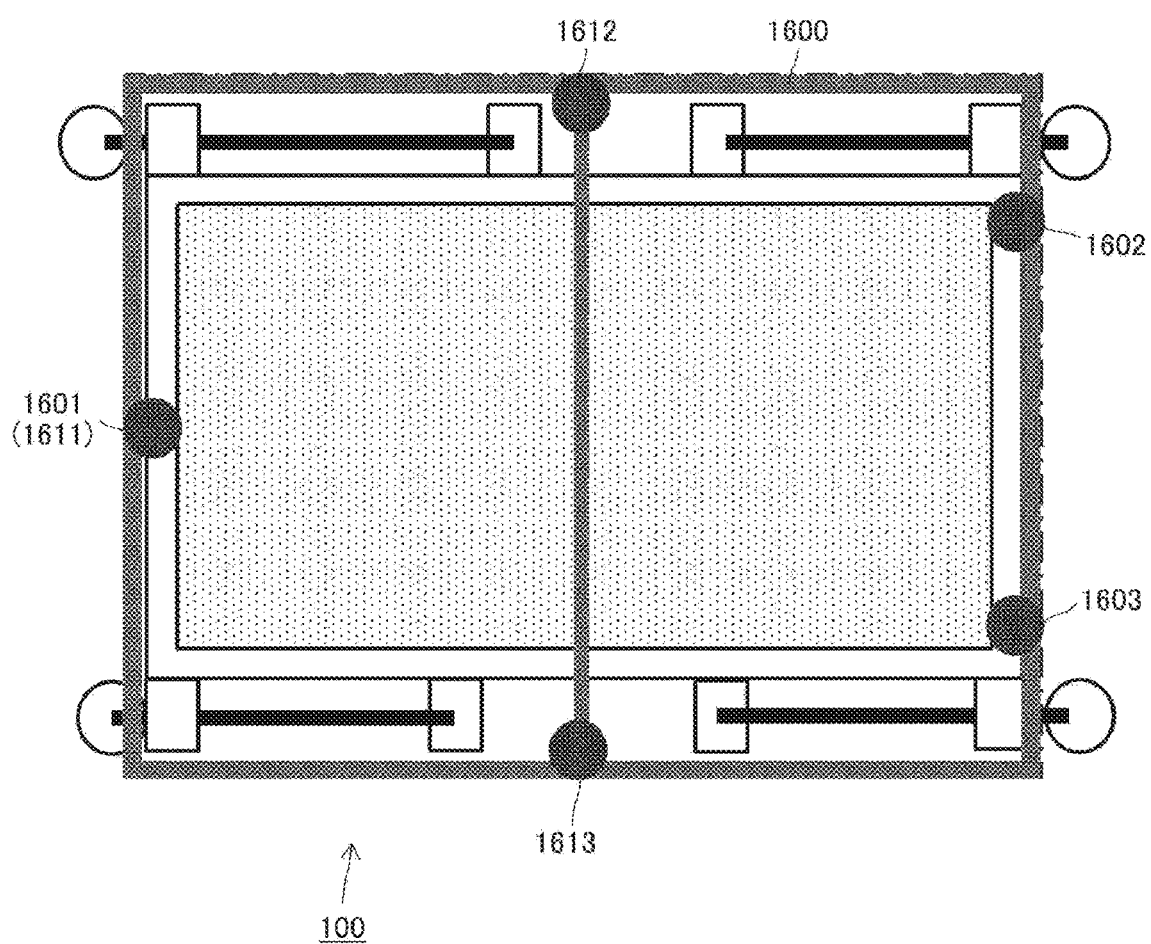
FIG. 19 is a diagram (top view) illustrating the connection structure between the body portion and the outer casing.

FIGS. 16 to 19 schematically illustrate a connection structure between the body portion 150 (or the main body of the robot device 100) and the outer casing 600. In these drawings, FIG. 16 is a perspective view of the robot device 100 from the front left, FIG. 17 is a rear view of the robot device 100, FIG. 18 is a left side view of the robot device 100, FIG. 19 is a top view of the robot device 100, and in each case, the outline of the outer casing 600 is represented by a one dot chain line.

In FIGS. 16 to 19, the structure of a frame 1600 with which the body portion 150 supports the outer casing 600 is illustrated in gray. However, in order to prevent the drawings from being complicated, the frame 1600 is roughly drawn with a part omitted. The frame 1600 includes three connection portions 1601, 1602, and 1603 with the upper surface of the outer casing 600. Furthermore, the frame 1600 includes four connection portions 1611, 1612, 1613, and 1614 with a lower end edge of the outer casing 600.

The three connection portions 1601, 1602, and 1603 support the outer casing 600 in the vicinity of the front center and rear left and right ends of the upper surface of the outer casing 600, but do not interfere with any of movable ranges of the movable legs 110, 120, 130, and 140. Furthermore, the four connection portions 1611, 1612, 1613, and 1614 with the lower end edge of the outer casing 600 support the lower end edge of the outer casing 600 in the vicinity of the front center, the left side center, the rear center, and the right side center of the body portion 150, respectively, but does not interfere with toe trajectories of the movable legs 110, 120, 130, and 140.

Figure 20:
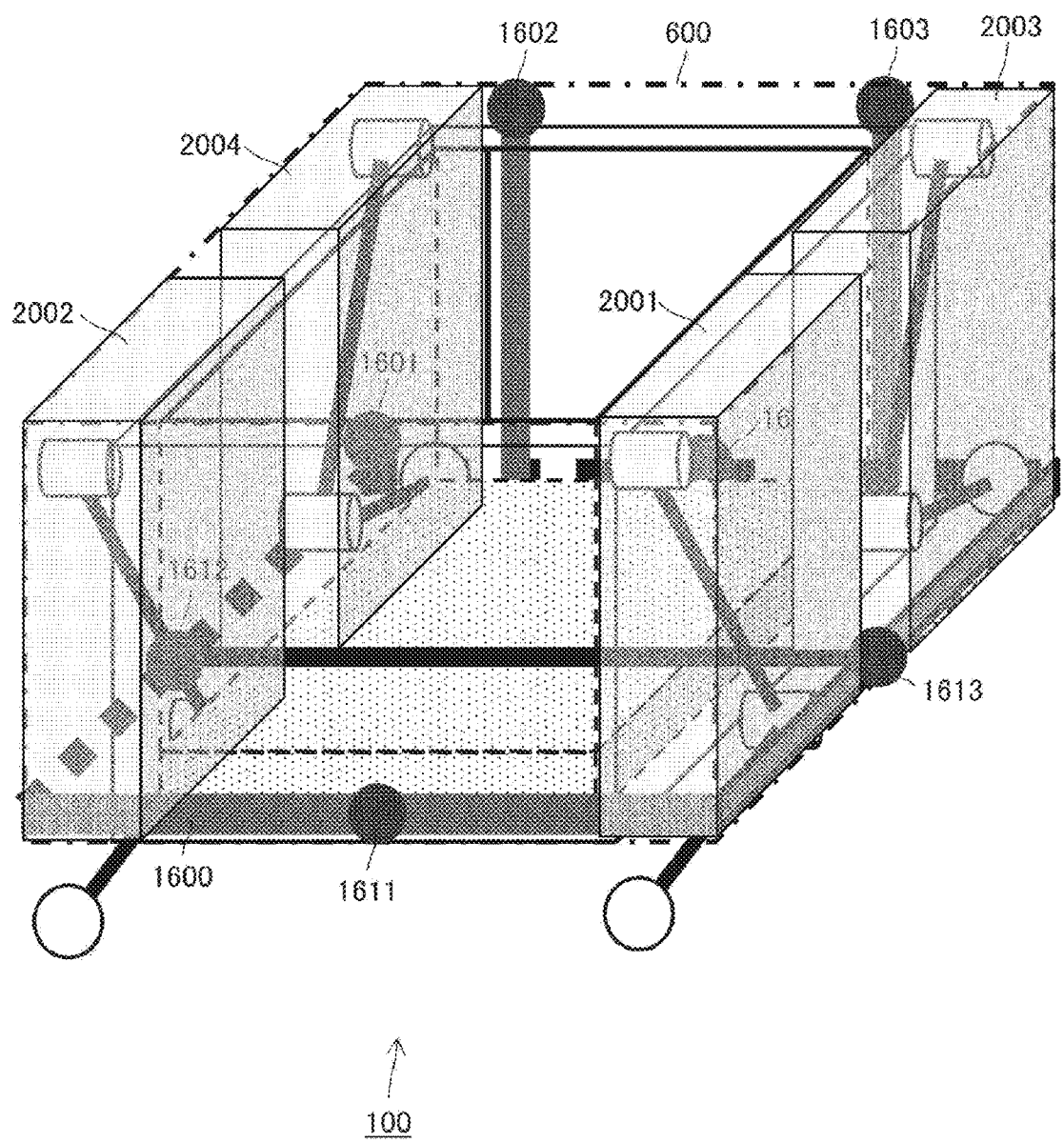
FIG. 20 is a diagram (perspective view) illustrating the relationship between a frame that supports the outer casing and movable ranges of the movable legs.
Figure 21:
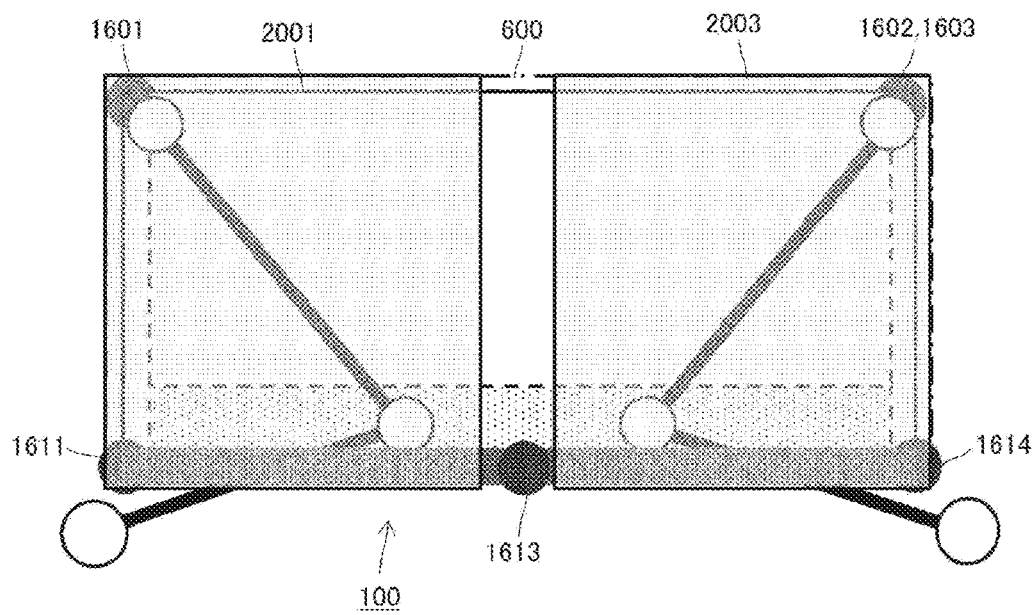
FIG. 21 is a diagram (left side view) illustrating the relationship between the frame that supports the outer casing and the movable ranges of the movable legs.
Figure 22:
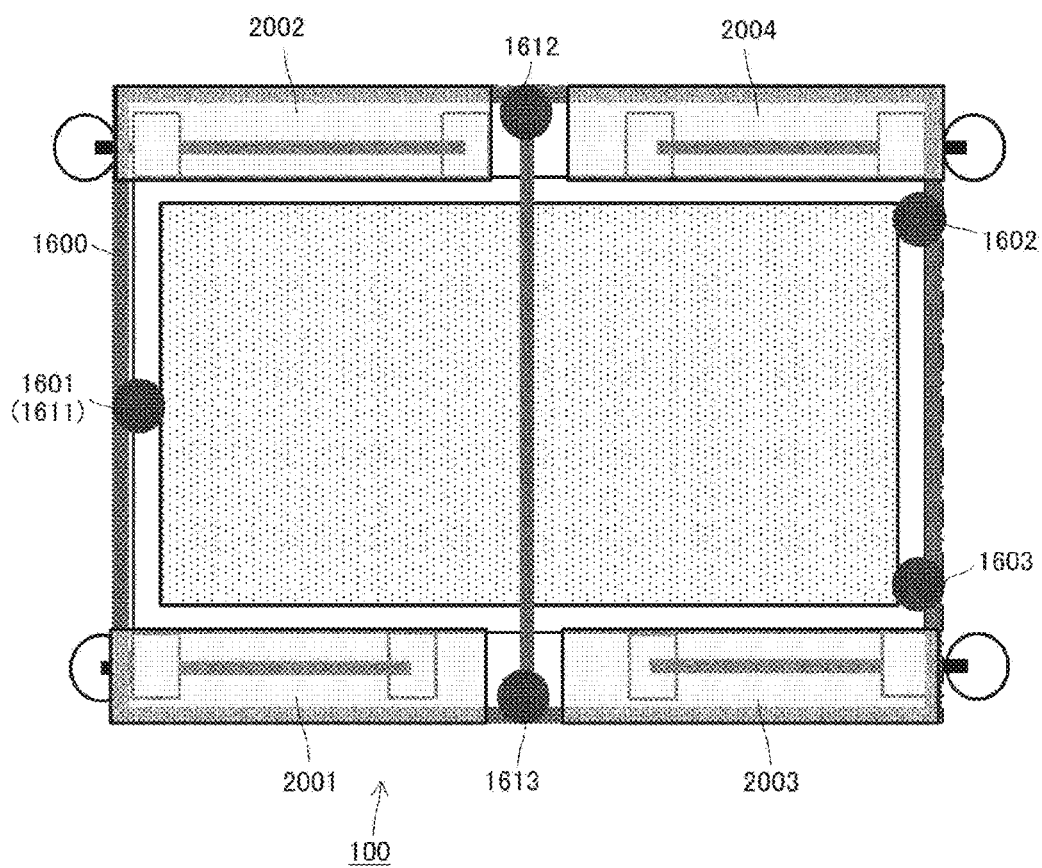
FIG. 22 is a diagram (top view) illustrating the relationship between the frame that supports the outer casing and the movable ranges of the movable legs.

FIGS. 20 to 22 illustrate the relationship between the frame 1600 that supports the outer casing 600 and movable ranges 2001, 2002, 2003, and 2004 of the movable legs 110, 120, 130, and 140. In these drawings, FIG. 20 is a perspective view of the robot device 100 from the left front, FIG. 21 is a left side view of the robot device 100, and FIG. 20 is a top view of the robot device 100. It can be understood, from each drawing, that the frame 1600 supports the outer casing 600 at the connection portions 1601, 1602, and 1603, and the connection portions 1611, 1612, 1613, and 1614 without interfering with the toe trajectories of the movable legs 110, 120, 130, and 140.

Furthermore, the frame 1600 can support the outer casing 600 covering the movable legs 110, 120, 130, and 140 with high rigidity. Therefore, in a case where a sensor such as a camera or LIDAR is attached to the outer casing 600, sensitivity deterioration due to vibration can be suppressed. In addition, if a camera is arranged around at least one of the movable leg 110, 120, 130, or 140, it is possible to detect a wide range of peripheral information about a road surface, an obstacle, and the like. Therefore, safe walking can be secured on the basis of a recognition result of a captured image.

Note that the outer casing 600 may have a transparent structure, and a camera 211 may be arranged inside the outer casing 600. Alternatively, only a part of the outer casing 600 where the camera 211 is arranged may partially have a transparent structure, or the outer casing 600 may be provided with a window or a peephole for viewing the outside world from the camera 211 inside the outer casing 600.

E. MODIFIED EXAMPLE (1)

Figure 23:
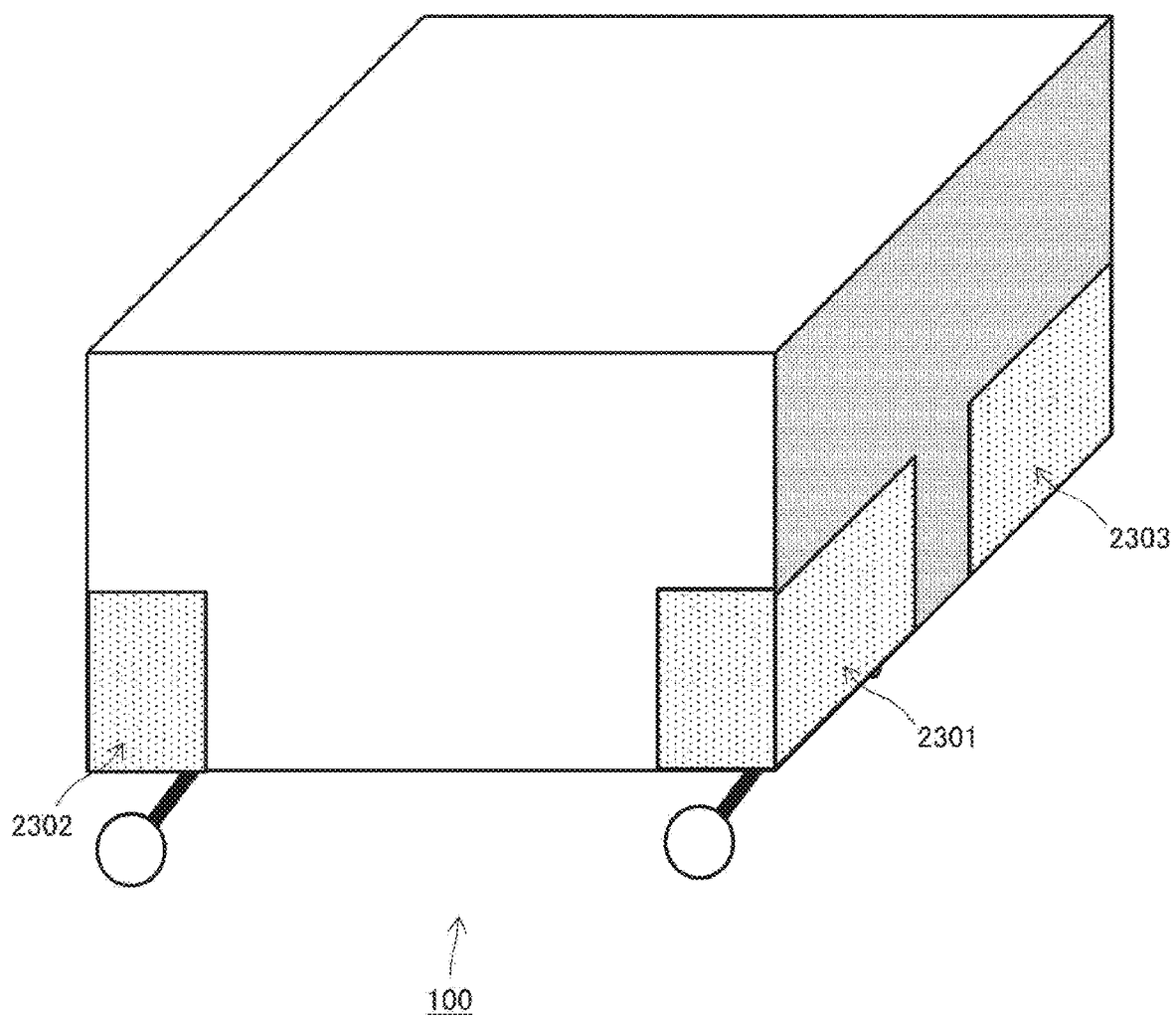
FIG. 23 is a diagram illustrating a modified example of the outer casing.

FIG. 23 illustrates portions 2301, 2302, 2303, and the like of the outer casing 600 around the toes of the movable legs 110, 120, 130, and 140, which are filled with dots. These areas 2301, 2302, 2303, and the like are configured with a flexible material such as thin silicone rubber, curtains, or bellows, so that the movable ranges of the movable legs 110 and 120 corresponding to the front legs can be expanded forward, and the movable ranges of the movable legs 130 and 140 corresponding to the rear legs can be expanded backward. Furthermore, the ranges of motion of the movable legs 110, 120, 130, and 140 are covered with the flexible material, curtains or bellows, so that it is possible to prevent a finger from being pinched by the movable legs 110, 120, 130, and 140 without disturbing the ranges of motion of the toes.

F. MODIFIED EXAMPLE (2)

Figure 24:
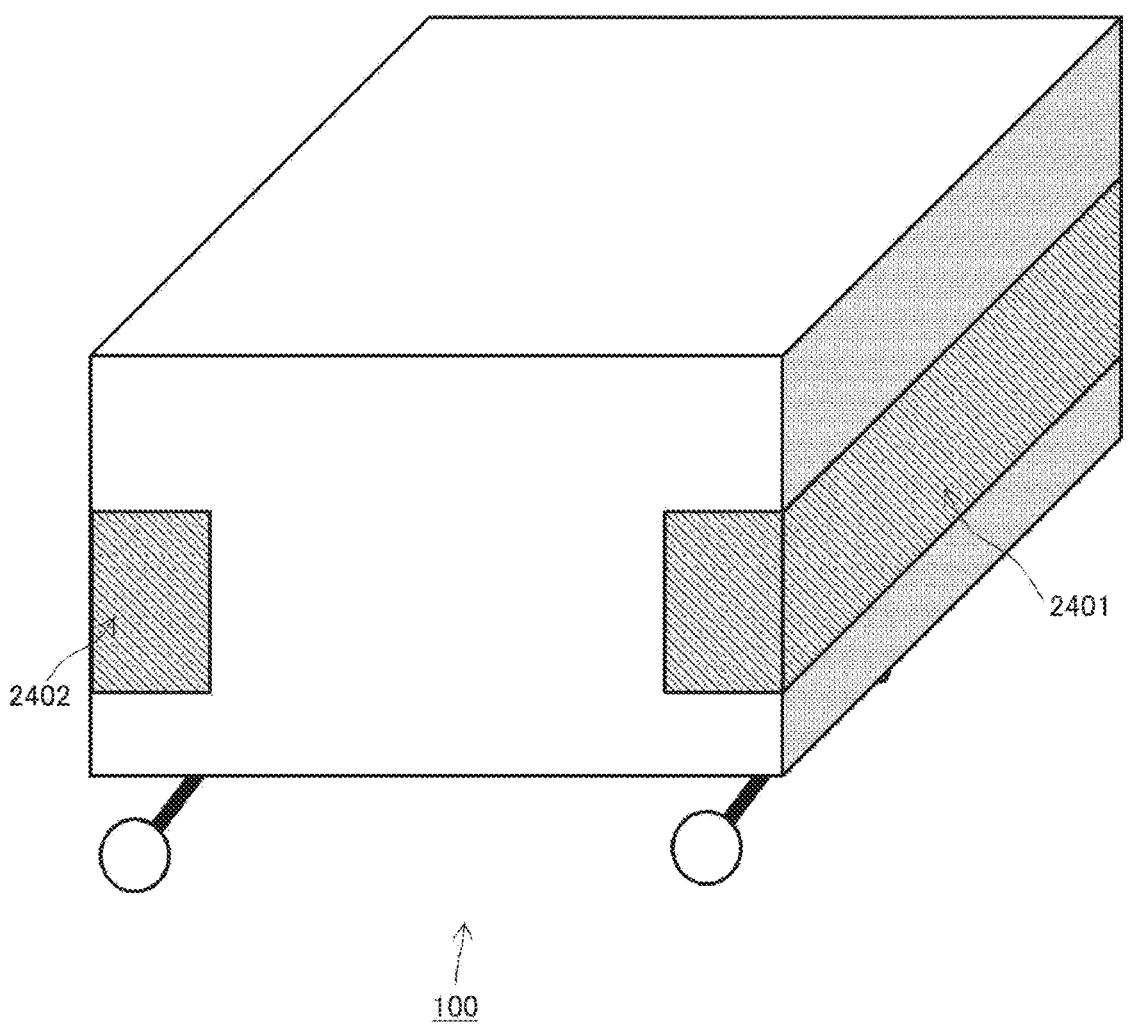
FIG. 24 is a diagram illustrating a state in which ambient observation sensors are attached to the outer casing.

FIG. 24 illustrates a state in which ambient observation sensors 2401, 2402, and the like are attached to parts of the outer casing 600. In FIG. 24, the ambient observation sensors 2401, 2402, and the like are attached to only two places for simplification, but may be attached to a plurality of places.

The ambient observation sensors 2401, 2402, and the like each include, for example, an infrared sensor, a capacitive human detection sensor, a tactile sensor, an air pressure sensor, and the like. Different types of sensors may be used depending on the parts where the sensors are attached. When detecting a human having entered a proximity area with one of the ambient observation sensors 2401 and 2402, the main controller 231 may adjust the sensitivity of another sensor, or perform control for avoiding a collision with the human or an obstacle, such as a safe stop, or control for mitigating impact in the event of a collision. The ambient observation sensors 2401, 2402, and the like may be arranged such that proximity can be detected in all directions.

G. MODIFIED EXAMPLE (3)

Figure 25:
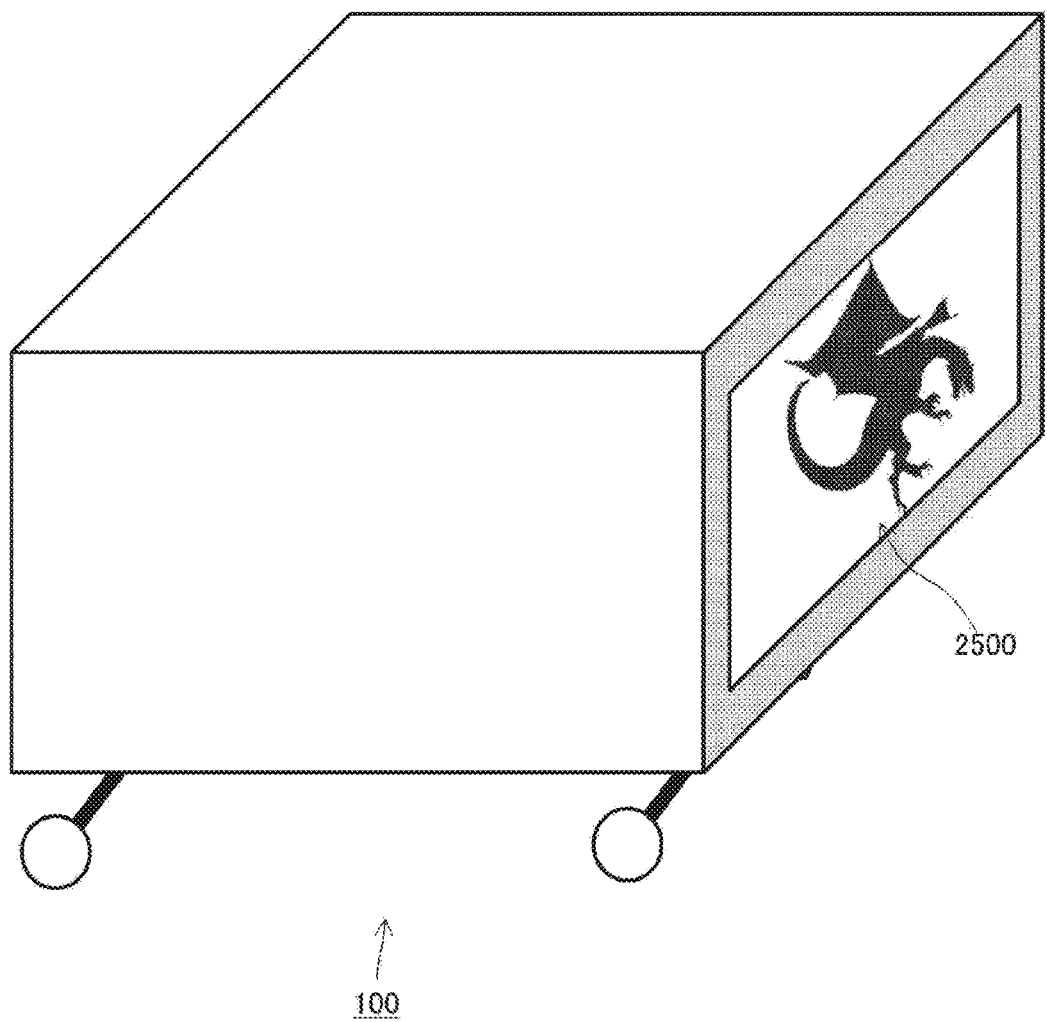
FIG. 25 is a diagram illustrating a state in which a surface display is mounted on a wall surface of the outer casing.

FIG. 25 illustrates a state in which a surface display 2500 is mounted on a wall surface of the outer casing 600 (the left side surface in the illustrated example). Information displayed on the surface display 2500 varies. The main controller 231 controls image information displayed on the surface display 2500 on the basis of the information obtained from the external sensor unit 210 or the like. For example, the main controller 231 displays, on the surface display 2500, the name of the owner of the robot device 100, the name of the business operator that provides the transportation service using the robot device 100, information regarding the load being transported (requiring refrigeration, dangerous substance, or the like), and information based on the current position of the robot device 100, the movement route, the destination, or the like. Furthermore, the main controller 231 may select an image to be displayed on the displaying display 2500 on the basis of attribute information of a human on the spot, who has been identified on the basis of face recognition of an image captured by the camera 211 or a detection result of another sensor.

Furthermore, the main controller 231 may control the surface display 2500 to display advertisement information. The advertisement information is displayed on the surface display 2500, so that the robot device 100 can also be used as digital signage for monetization. The advertisement information may be either a still image or a moving image. The image displayed on the surface display 2500 may be received via the communication unit 235. The advertisement information displayed on the surface display 2500 may be switched hourly or in real time. For example, contents of the load being transported, the advertisement information related to the requester of the transportation, or the advertisement information related to the transportation route may be displayed on the surface display 2500.

H. MODIFIED EXAMPLE (4)

Figure 26:
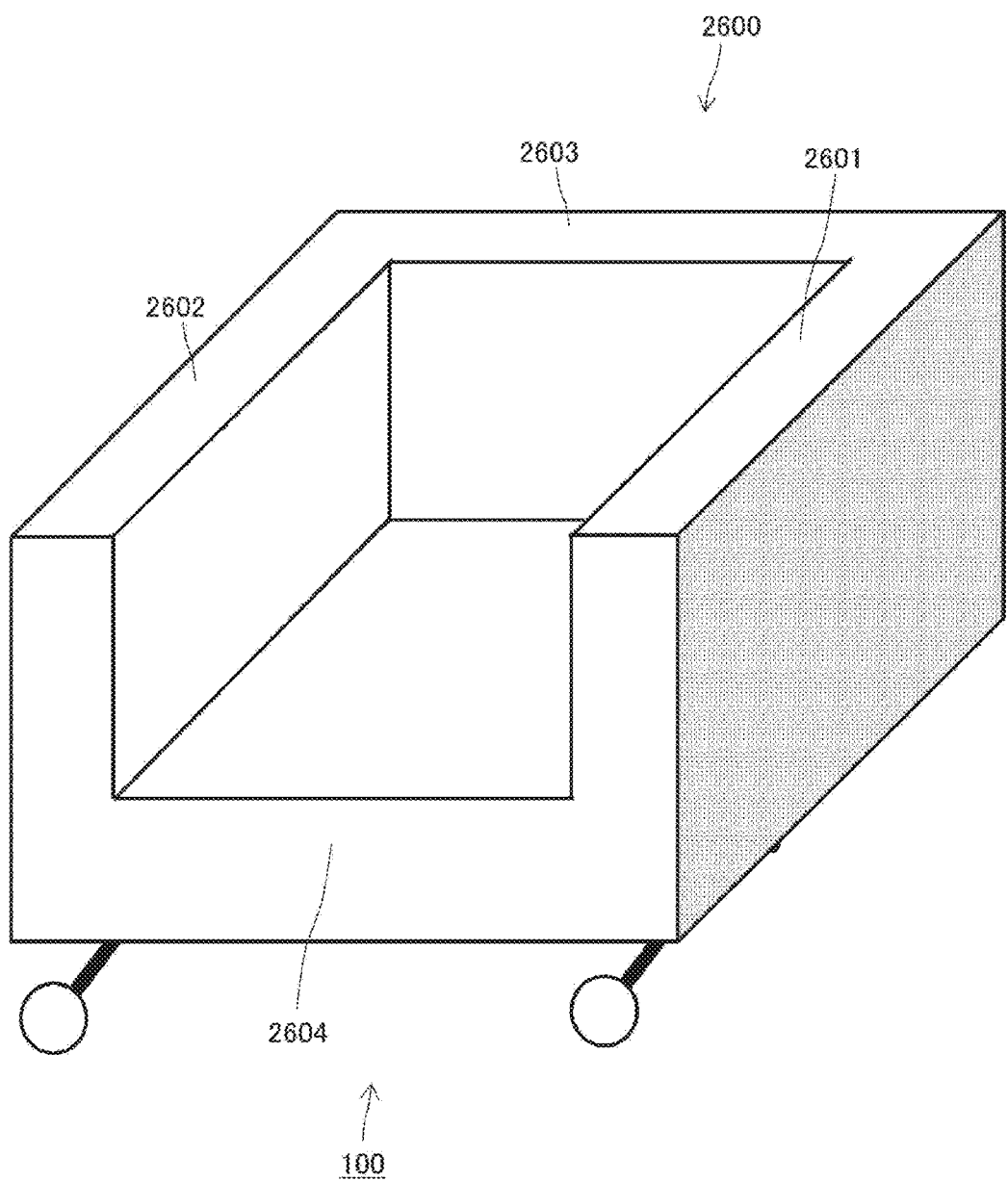
FIG. 26 is a diagram illustrating a modified example in which the robot device is applied to personal mobility.
Figure 27:
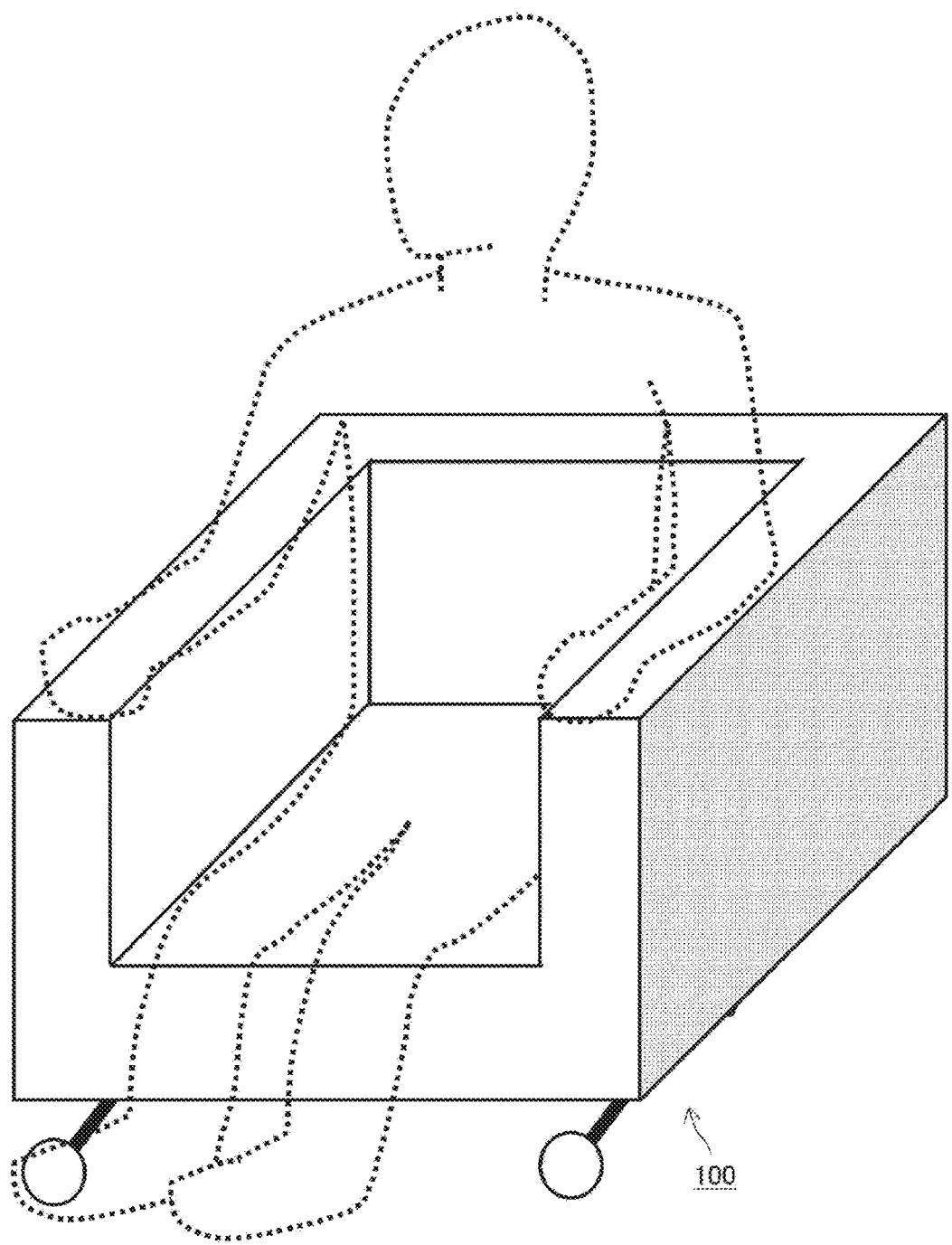
FIG. 27 is a diagram illustrating the modified example in which the robot device is applied to personal mobility.

The embodiment has been described above in which the robot device 100 is applied to transportation of a load, and the load is placed on the loading portion provided with the body portion 150 hollow so as to be transported. Meanwhile, as illustrated in FIG. 26, a modified example can be considered in which a human is seated in a chair-shaped outer casing 2600 and the robot device 100 is applied to personal mobility. FIG. 27 also illustrates an image of the human being seated.

As can be seen by comparison of FIG. 26 and FIG. 20, the outer casing 2600 includes left and right armrests 2601 and 2602 and a backrest 2603 to protect the movable ranges 2001, 2002, 2003, and 2004 of the movable legs 110, 120, 130, and 140, and has the shape of a chair in which the upper surface of the body portion 160 (or the controller 150) serves as a seat surface 2604. It can be said that personal mobility is implemented by the structure in which a human is seated in a space surrounded by the four movable legs 110, 120, 130, and 140. The chair-shaped outer casing 2600 can prevent interference between the movable legs 110, 120, 130, and 140 and a human leg, and can secure human safety.

I. MODIFIED EXAMPLE (5)

Figure 28:
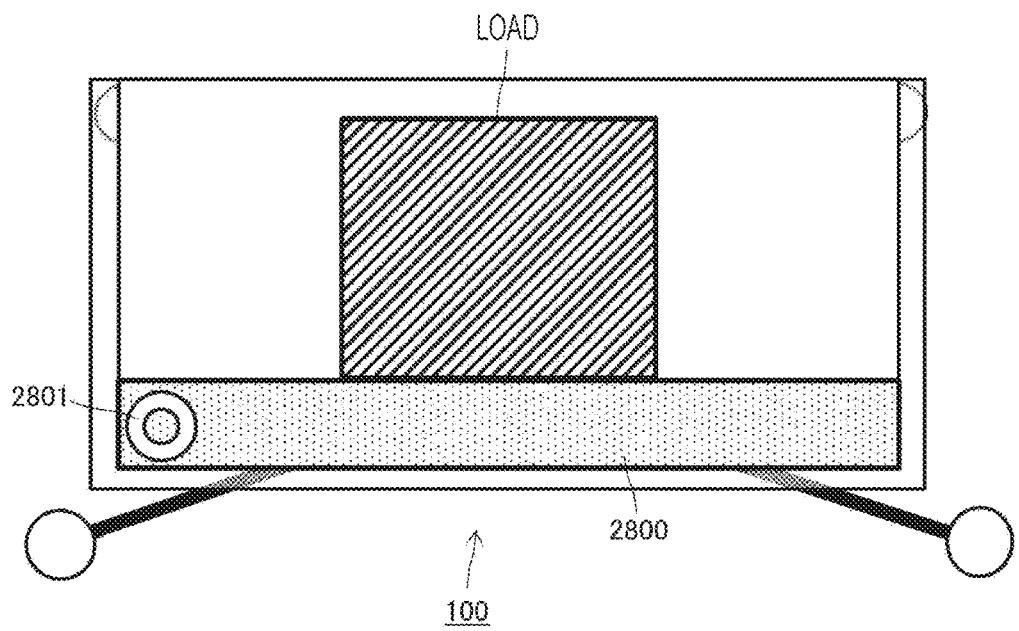
FIG. 28 is a diagram illustrating a modified example in which a loading platform inclining mechanism is provided in a loading portion of the robot device.
Figure 29:
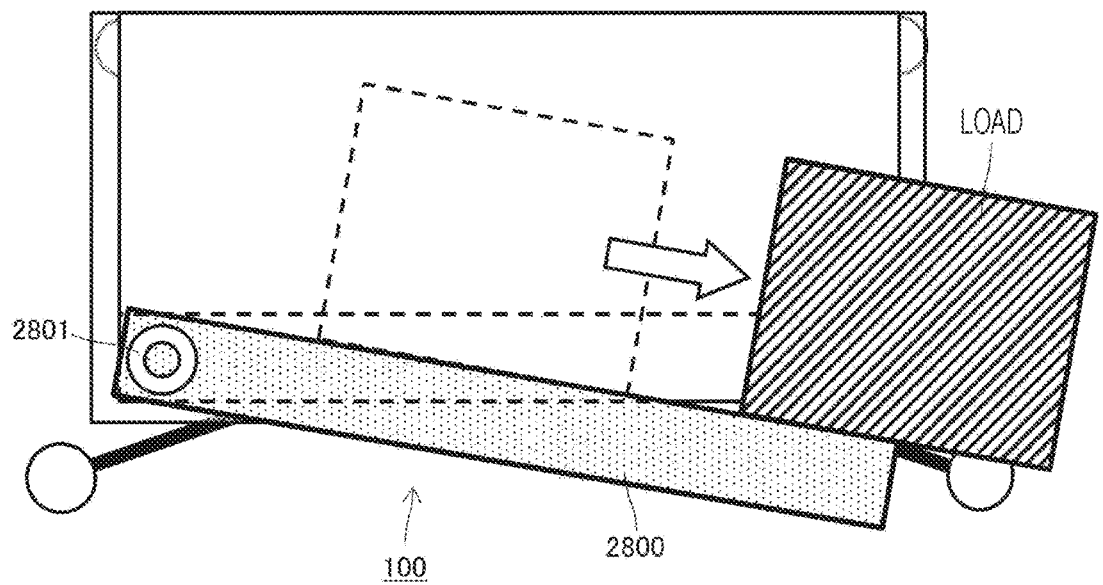
FIG. 29 is a diagram illustrating the modified example in which the loading platform inclining mechanism is provided in the loading portion of the robot device.

As described in the above-described section A, the body portion 150 has the hollow box shape and includes the loading portion for loading a load. As illustrated in FIG. 28, a structure may be adopted in which a loading platform 2800 on a bottom surface of the loading portion is rotatably supported by a rotary drive unit 2801 at the tip. Then, as illustrated in FIG. 29, when the rotary drive unit 2801 is driven and the rear end of the loading platform 2800 is inclined downward to form a slope, the load slides down the slope due to gravity, and thus unloading can be easily implemented.

The electric system of the robot device 100 (see FIG. 13) may include a sub-controller that controls the drive of the rotary drive unit 2801. Furthermore, if the main controller 231 supports the drive of the rotary drive unit 2801 and inclines the loading platform 2800 when the robot device 100 arrives at the load transport destination, an autonomous unloading operation can be implemented.

J. Summary

Finally, the effects brought about by the legged robot device 100 to which the technology according to the present disclosure is applied will be mentioned.

(1) The robot device 100 has a structure in which the hip joint portions 114, 124, 134, and 144 of the movable legs 110, 120, 130, and 140 are connected to the vicinity of the upper end of the body portion 150, and the center of gravity G of the body portion 150 can be arranged below one-third of the distance between the hip joint and the knee joint of each movable leg, so that it is possible to keep the center of gravity low and stabilize the posture.

(2) The robot device 100 has a structure in which the body portion 150 has the hollow box shape and includes the loading portion for loading a load, and the load is placed in the space surrounded by the four movable legs 110, 120, 130, and 140, so that it is possible to secure the maximum storage space for a load and achieve compactness.

(3) The robot device 100 has a structure in which the body portion 150 supports the outer casing 600 with the frame 1600, so that it is possible to improve the strength of the body portion 150 while securing weight reduction.

(4) In the robot device 100, the body portion 150 can be thin.

(5) Covering the entire robot device 100 including the movable legs 110, 120, 130, and 140 with the outer casing 600 makes it possible to prevent foreign matter from being entangled in the movable legs 110, 120, 130, and 140, such as finger pinching.

(6) The robot device 100 provides the outer casing 600 with one of the upper lid, the front door, the rear door, and the side door, so that it is possible to easily take out the load loaded on the loading portion of the body portion 150.

(7) It is possible to see at a glance the movable range of the robot device 100 moving with the legs, so that it is easy to grasp the range in which a human can approach the robot device 100.

(8) The robot device 100 can secure the rigidity of the outer casing 600 covering the movable legs 110, 120, 130, and 140, so that it is possible to suppress the deterioration of sensitivity due to vibration of the sensors attached to the outer casing 600.

(9) In the robot device 100, attaching the ambient observation sensors 2401, 2402, and the like to the outer casing 600 makes it possible to perform control for avoiding a collision with a human or an obstacle or for mitigating impact in the event of a collision.

(10) The outer casing 600 is attached to the robot device 100 so as not to interfere with any of the movable ranges of the movable legs 110, 120, 130, and 140, so that it is possible to secure the ranges of motion of the movable legs 110, 120, 130, and 140. Furthermore, the portions of the outer casing 600 around the toes of the movable legs 110, 120, 130, and 140 are configured with a flexible material such as thin silicone rubber, curtains, or bellows, so that it is possible to achieve safety and compactness, and at the same time, to secure wider ranges of motion of the toes.

(11) In the robot device 100, a method such as applying removable decorations or the like to a wall surface of the outer casing 600 makes it possible to flexibly change the exterior design at low cost so as to appeal to the sensitivity of a user according to a request of the user.

(12) In the robot device 100, attaching an ambient observation sensor to the outer casing 600 makes it possible to perform control for avoiding a collision with a human or an obstacle and for mitigating impact in the event of a collision.

(13) In the robot device 100, arranging sensors such as cameras around the movable legs 110, 120, 130, and 140 makes it possible to detect a wide range of peripheral information about a road surface, an obstacle, and the like.

(14) The robot device 100 can be monetized by digital signage using the surface display 2500 arranged on a wall surface of the outer casing 600.

(15) The robot device 100 can be applied to personal mobility by making the outer casing 600 into the shape of a chair and allowing a human to be seated. The chair-shaped outer casing 2600 can prevent interference between the movable legs 110, 120, 130, and 140 and a human leg, and can secure human safety.

(16) The robot device 100 can easily unload a load by inclining the loading platform 2800 on which the load is placed to form a slope, so that it is possible to implement autonomous unloading.

(17) The robot device 100 has a structure in which the bottom surface of the body portion 150 is arranged above the plane 1401 arranged at the distance L between the hip joint 114 and the knee joint 113. Therefore, it is possible to avoid interference between the bottom surface of the body portion 150 and the floor surface when the robot device 100 traverses a rough ground or stairs while the maximum space is secured for the loading portion for loading an object.

INDUSTRIAL APPLICABILITY

The technology according to the present disclosure has been described above in detail with reference to the specific embodiment. However, it is obvious that a person skilled in the art can modify the embodiment or replace the embodiment with a substitute of the embodiment without departing from the gist of the technology according to the present disclosure.

Although the present specification has mainly described the embodiment in which the technology according to the present disclosure is applied to a four-legged robot device, the technology can be similarly applied to a legged mobile robot including any number of legs.

In short, the technology according to the present disclosure has been described in the form of an example, and the contents of the present specification should not be interpreted in a limited manner. Claims should be taken into consideration in order to determine the gist of the technology according to the present disclosure.

Note that the technology according to the present disclosure can also have the following configurations.

(1) A robot device including:
a plurality of legs; and
a body portion to which the legs are attached, the body portion having a bottom surface higher than a ground plane of the legs that are shortened to a maximum.

(1-1) The robot device according to (1), in which
each of the legs has a multi-link structure including a knee joint, and is attached to the body portion such that the bottom surface of the body portion is in the vicinity of the knee joint of each of the legs.

(1-2) The robot device according to (1), in which
each of the legs has a linear motion mechanism, and is attached to the body portion such that a toe of each of the legs whose linear motion mechanism is shortened to the maximum is higher than the bottom surface of the body portion.

(2) The robot device according to (1), in which
the body portion includes a loading portion on which a load is placed in a space surrounded by the plurality of legs.

(3) The robot device according to (1) or (2), further including
an outer casing that covers the entire robot device including the plurality of legs.

(4) The robot device according to (3), in which
the outer casing includes an openable/closable lid or door on at least one of an upper surface, a front surface, a rear surface, a left side surface, or a right side surface.

(5) The robot device according to (3) or (4), further including
a frame that connects the outer casing and the body portion so as not to interfere with movable ranges of the legs.

(6) The robot device according to any one of (3) to (5), in which
a camera or another sensor is arranged around the legs of the outer casing.

(7) The robot device according to any one of (3) to (6), in which
a portion of the outer casing around a toe of each of the legs is configured with a flexible material or an expandable component.

(8) The robot device according to any one of (3) to (7), in which
a surface of the outer casing is provided with a removable decoration.

(9) The robot device according to any one of (3) to (8), further including
a sensor that is attached to the outer casing and detects a proximate object.

(10) The robot device according to (9), in which
the sensor includes one of an infrared sensor, a capacitive human detection sensor, a tactile sensor, or an air pressure sensor.

(11) The robot device according to (9) or (10), further including
a controller that controls a safe stop or another operation of the robot device on the basis of a detection result of the sensor.

(12) The robot device according to any one of (3) to (11), further including
a camera arranged inside the outer casing, in which the outer casing includes a transmissive portion or an opening portion in a range of a field of view of the camera.

(13) The robot device according to any one of (3) to (12), further including:
a display attached to a surface of the outer casing; and
a controller that controls display of the display.

(14) The robot device according to (13), in which
the controller performs control to display advertisement information on the display.

(15) The robot device according to (14), in which
the controller switches the advertisement information in real time on the basis of a current position of the robot device, a human on a spot, or other sensor information.

(16) The robot device according to any one of (3) to (15), in which
the outer casing has a shape of a chair that allows a human to be seated in a space surrounded by the plurality of legs.

(17) The robot device according to (2), in which
the loading portion includes a drive unit that inclines a loading platform on which a load is placed to form a slope.

(18) The robot device according to any one of (1) to (17), in which
a center of gravity of the body portion is arranged below one-third of a total length of each of the legs that are shortened to the maximum.

(18-1) The robot device according to (18), in which
each of the legs has a multi-link structure including a knee joint, and
the center of gravity of the body portion is arranged below one-third of a distance between a hip joint and the knee joint of each of the legs.

(18-2) The robot device according to (18), in which
each of the legs has a linear motion mechanism, and
the center of gravity of the body portion is arranged below one-third of a total length of each of the legs whose linear motion mechanism is shortened to the maximum.

(19) The robot device according to any one of (1) to (18), in which each of the legs has a multi-link structure including a knee joint, and the bottom surface of the body portion is arranged higher than the knee joint when a thigh link of each of the legs is in a vertically downward posture.

REFERENCE SIGNS LIST

100 Robot device
110 Movable leg (left front leg)
111 Link (lower leg link)
112 Link (thigh link)
113 Knee joint portion
114 Hip joint portion
120 Movable leg (right front leg)
121 Link (lower leg link)
122 Link (thigh link)
123 Knee joint portion
124 Hip joint portion
130 Movable leg (left rear leg)
131 Link (lower leg link)
132 Link (thigh link)
133 Knee joint portion
134 Hip joint portion
140 Movable leg (right rear leg)
141 Link (lower leg link)
142 Link (thigh link)
143 Knee joint portion
144 Hip joint portion
150 Body portion
160 Controller
210 External sensor unit
211L, 211R Camera
212 Microphone
213 Touch sensor
221 Speaker
222 Display unit
230 Control unit
231 Main controller
232 Battery
233 Internal sensor unit
233A Battery sensor
233B Acceleration sensor
234 External memory
235 Communication unit
241, 242, 243, 244 Sub-controller
600 Outer casing
1001 Upper lid
1101 Front door
1201 Side door
3010 Movable leg (left front leg)
3011 Rod
3012 Cylinder
3014 Hip joint portion
3020 Movable leg (right front leg)
3021 Rod
3022 Cylinder
3024 Hip joint portion
3030 Movable leg (left rear leg)
3031 Rod
3032 Cylinder
3034 Hip joint portion
3040 Movable leg (left rear leg)
3041 Rod
3042 Cylinder
3044 Hip joint portion

The invention claimed is:

1. A robot device, comprising:
a plurality of legs, wherein each of the plurality of legs has a hip joint and a knee joint; and
a body portion, the body portion having an upper surface and a bottom surface, wherein
each of the plurality of legs are attached to the upper surface of the body portion via the respective hip joint, and
a height of the body portion is less than a distance between the hip joint and the knee joint of each of the plurality of legs.

2. The robot device according to claim 1, wherein
the body portion includes a loading portion on which a load is placed in a space surrounded by the plurality of legs.

3. The robot device according to claim 2, wherein
the loading portion includes a drive unit, wherein the drive unit is configured to incline a loading platform on which a load is placed to form a slope.

4. The robot device according to claim 1, further comprising
an outer casing that covers the robot device including the plurality of legs.

5. The robot device according to claim 4, wherein
the outer casing includes one of an openable/closable lid or a door on at least one of an upper surface of the outer casing, a front surface of the outer casing, a rear surface of the outer casing, a left side surface of the outer casing, or a right side surface of the outer casing.

6. The robot device according to claim 4, further comprising
a frame that connects the outer casing and the body portion, wherein the frame does not interfere with a movable range of the plurality of legs.

7. The robot device according to claim 4, wherein
one or more sensors are arranged around the plurality of legs, and
the one or more sensors includes a camera.

8. The robot device according to claim 4, wherein
a portion of the outer casing around a toe of each of the plurality of legs is configured with one of a flexible material or an expandable component.

9. The robot device according to claim 4, wherein
a wall surface of the outer casing is provided with a removable decoration.

10. The robot device according to claim 4, further comprising
a sensor attached to the outer casing, wherein the sensor is configured to detect a proximate object.

11. The robot device according to claim 10, wherein
the sensor includes one of an infrared sensor, a capacitive human detection sensor, a tactile sensor, or an air pressure sensor.

12. The robot device according to claim 10, further comprising
a controller configured to control a safe stop or another operation of the robot device based on a detection result of the sensor.

13. The robot device according to claim 4, further comprising
a camera inside the outer casing, wherein the outer casing includes a transmissive portion or an opening portion in a range of a field of view of the camera.

14. The robot device according to claim 4, further comprising:
a display attached to a surface of the outer casing; and
a controller configured to control the display.

15. The robot device according to claim 14, wherein
the controller is further configured to control display of
advertisement information on the display.

16. The robot device according to claim 15, wherein
the controller is further configured to switch the advertisement information in real time based on a current position of the robot device, a human on a spot, or sensor information.

17. The robot device according to claim 4, wherein
the outer casing has a shape of a chair that allows a human to be seated in a space surrounded by the plurality of legs.

18. The robot device according to claim 1, wherein
a center of gravity of the body portion is arranged below one-third of the distance between the hip joint and the knee joint of each of the plurality of legs.

19. The robot device according to claim 1, wherein
each of the plurality of legs has a multi-link structure including the knee joint, and
the bottom surface of the body portion is arranged higher than the knee joint when a thigh link of each of the plurality of legs is in a vertically downward posture.

* * * * *